(12) United States Patent
Imai

(10) Patent No.: US 12,470,853 B2
(45) Date of Patent: Nov. 11, 2025

(54) REPEATER DEVICE AND TRANSMISSION CONTROL TECHNIQUES IN QUANTUM CRYPTOGRAPHIC COMMUNICATION SYSTEM

(71) Applicant: NEC Corporation, Tokyo (JP)

(72) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 306 days.

(21) Appl. No.: 18/227,874

(22) Filed: Jul. 28, 2023

(65) Prior Publication Data

US 2024/0107207 A1  Mar. 28, 2024

(30) Foreign Application Priority Data

Sep. 28, 2022  (JP) .................................. 2022-155039

(51) Int. Cl.
*H04B 10/70* (2013.01)
*H04L 45/02* (2022.01)
*H04Q 11/00* (2006.01)

(52) U.S. Cl.
CPC ......... *H04Q 11/0062* (2013.01); *H04L 45/02* (2013.01); *H04Q 11/0005* (2013.01); *H04Q 2011/0024* (2013.01); *H04Q 2011/0073* (2013.01); *H04Q 2213/13191* (2013.01)

(58) Field of Classification Search
CPC .................................................... H04B 10/70
See application file for complete search history.

(56) References Cited

U.S. PATENT DOCUMENTS

| | | | |
|---|---|---|---|
| 11,196,550 B2 | 12/2021 | Yuan et al. | |
| 2014/0341575 A1* | 11/2014 | Choi | H04J 14/02216 398/51 |
| 2019/0149233 A1 | 5/2019 | Yuan et al. | |
| 2021/0126778 A1* | 4/2021 | Parkin | H04Q 11/0005 |
| 2024/0048371 A1* | 2/2024 | Long | H04B 10/29 |

FOREIGN PATENT DOCUMENTS

| | | |
|---|---|---|
| JP | 2000-101570 A | 4/2000 |
| JP | 2007-266738 A | 10/2007 |

OTHER PUBLICATIONS

Extended European Search Report for EP Application No. 23199405.4, dated on Feb. 28, 2024.

* cited by examiner

*Primary Examiner* — Shi K Li
(74) *Attorney, Agent, or Firm* — Sughrue Mion, PLLC

(57) ABSTRACT

A repeater device that can achieve signal transferring and path switching in optical transmission lines susceptible to environmental changes is provided. The repeater device receives weak signal light and normal reference light and transmits them in a communication network. The repeater includes: an optical route selector that selects an input-side spatial link connected to an upstream adjacent node and an output-side spatial link connected to a downstream adjacent node; a link state detector that detects a link state of at least one of the input-side spatial link and the output-side spatial link, wherein the link state is an attenuation rate or a transmission rate; and a controller that controls the optical route selector to select an optimal pair of output-side spatial link and input-side spatial link according to the link state.

20 Claims, 19 Drawing Sheets

FIRST EXAMPLE

MODIFIED EXAMPLE

THIRD EXAMPLE

REPEATER DEVICE AND TRANSMISSION CONTROL TECHNIQUES IN QUANTUM CRYPTOGRAPHIC COMMUNICATION SYSTEM

INCORPORATION BY REFERENCE

This application is based upon and claims the benefit of priority from Japanese Patent Application No. 2022-155039, filed on Sep. 28, 2022, the disclosure of which is incorporated herein in its entirety by reference.

BACKGROUND

The present application relates to quantum cryptographic communication systems, and in particular to repeater and transmission techniques and network management techniques.

In the field of optical communications, quantum key distribution (QKD) systems have been studied actively and put into practical use as a means of achieving high confidentiality in transmission channels. Recently, continuous-variable QKD has been proposed, which uses continuous variables such as the quadrature-phase amplitude of light instead of discrete variables in photon units. In particular, homodyne detection has attracted attention. The reason is that the homodyne detection measures the quadrature-phase amplitude at the receiver side, allowing measurement near the quantum noise limit to achieve high quantum efficiency even in the case of ordinary photodiodes used at room temperature (Japanese Patent Application Publication No. JP2000-101570: Patent document 1).

According to Patent document 1, in continuous-variable QKD, the laser light is split into a reference light (hereinafter referred to as LO (Local Oscillation) light) and a signal light by a beam splitter at a transmitter (Alice) terminal. The LO light and the randomly phase-modulated weak signal light are transmitted to the receiver (Bob) terminal. At the receiver terminal, the arriving LO light is randomly phase-modulated. The LO light thus obtained and the arriving weak signal light are detected by two photodetectors through a beam splitter. The homodyne detection enables the extraction of the phase information of the signal light that has been phase-modulated at the transmitter.

As described in Patent document 1, the level average of the signal light obtained by homodyne detection is represented by $2\sqrt{(n1)}\sqrt{(n0)}$, wherein n1 is the number of photons of the signal light and n0 is the number of photons of the LO light. It is known that the transmission loss of an optical fiber is more than 0.2 dB/km. The optical power is attenuated by 10 dB, or $\frac{1}{10}$, at a transmission distance of 50 km, and by $\frac{1}{100}$ at a transmission distance of 100 km. Accordingly, the signal level obtained by homodyne detection is similarly reduced to $\frac{1}{10}$ and $\frac{1}{100}$ or less at transmission distances of 50 km and 100 km, respectively.

Such signal level attenuation degrades the signal-to-noise (SN) ratio in homodyne detection. It is necessary to increase the signal level to prevent SN ratio degradation. However, the installation of an optical amplifier on the transmission line cannot be adopted because the signal light is also amplified in the transmission line, which may affect the cryptographic key information. As an alternative, the laser output power of the transmitter terminal may also be increased. However, to compensate for the above signal level attenuation, the output power of the laser light source must be significantly increased, for example, from 10 mW (Class 1) to 1 W (Class 4) at a wavelength band of 1.5 μm. Such a power-increase measure may be impractical due to upsizing of equipment, durability problems with optical components, and reduced security during transmission.

To improve the SN ratio in homodyne detection, a measure of amplifying only LO light at the receiver terminal has been proposed in Japanese Patent Application Publication No. JP2007-266738 (Patent document 2).

SUMMARY

However, the above-mentioned Patent documents 1 and 2 assume a system using the optical fiber as an optical transmission line. Accordingly, sufficient SN ratio and output stability cannot be expected in the case of using an optical transmission line which has a larger attenuation rate than optical fibers and propagation characteristics susceptible to environment. For example, assuming free space as an optical transmission line, it is necessary to take into account the amount of water vapor in the air, local variations in air density due to temperature changes, etc. In the present disclosure, free space is assumed to be optical transmission space having intensity reduction factors such as scattering and absorbing. Patent documents 1 and 2 do not realize problems developed in the case of using an optical transmission line of large attenuation rate nor take any measure against such problems.

In addition, an optical transmission line such as free space has a large attenuation rate, which may make long-distant signal transmission difficult. In general communication systems, repeaters may be installed in the transmission path to extend the transmission distance. However, in a QKD system, weak signal light having quantum states should be passed as it is through a repeater. Accordingly, the weak signal light cannot be photoelectrically converted at the repeater. For this reason, the QKD system using free space is difficult to extend the transmission distance.

Furthermore, the QKD system employs a scheme in a transmitter (Alice) sends weak signal light to a receiver (Bob), which generates an shared encryption key based on the arrived signal light. Accordingly, the QKD system does not assume the construction of a network that can switch the path of the signal light in the first place.

An object of the present invention is to provide a quantum cryptographic communication network, a repeater device, a transmission control method, and a network management device that can easily realize signal transferring and path switching in the case of using optical transmission lines susceptible to the propagation characteristics of light due to environmental changes.

According to an illustrative embodiment of the disclosure, a repeater device that receives signal light and reference light and transmits them in a communication network, wherein the signal light and the reference light are generated from coherent light, wherein the signal light is light of weak intensity having quantum states and the reference light is light of normal intensity having no quantum states, the repeater device includes: an optical route selector configured to select an input-side spatial link connected to an upstream adjacent node and an output-side spatial link connected to a downstream adjacent node; a link state detector that detects a link state of at least one of the input-side spatial link and the output-side spatial link, wherein the link state is an attenuation rate or a transmission rate; and a controller configured to control the optical route selector to select an optimal pair of output-side spatial link and input-side spatial link according to the link state.

According to an illustrative embodiment of the disclosure, a network management device in a communication network in which a plurality of nodes including a transmitter, a receiver and a plurality of repeater devices are connected by spatial links, wherein the transmitter generates signal light and reference light from coherent light and transmits the signal light and the reference light to the receiver through at least one repeater device, wherein the signal light is light of weak intensity having quantum states and the reference light is light of normal intensity having no quantum states, the network management device comprising: a storage that stores a network configuration of the nodes and the spatial links; a link state collector that collects link states of spatial links accommodated by each node from the plurality of nodes; and a network controller configured to: select an optimal route in the communication network based on the link states of the spatial links; and control each of repeater devices on the route so that each repeater device selects spatial links constituting the route.

According to an illustrative embodiment of the disclosure, a transmission control method in a repeater device that receives signal light and reference light and transmits them in a communication network, wherein the signal light and the reference light are generated from coherent light, wherein the signal light is light of weak intensity having quantum states and the reference light is light of normal intensity having no quantum states, the method comprising: by an optical route selector, selecting an input-side spatial link connected to an upstream adjacent node and an output-side spatial link connected to a downstream adjacent node; by a link state detector, detecting a link state of at least one of the input-side spatial link and the output-side spatial link, wherein the link state is an attenuation rate or a transmission rate; and by a controller, controlling the optical route selector to select an optimal pair of output-side spatial link and input-side spatial link according to the link state.

According to the inventions as described above, signal transferring and path switching can be easily realized in the case of using optical transmission lines susceptible to the propagation characteristics of light due to environmental changes.

DETAILED DESCRIPTION

Figure 1:
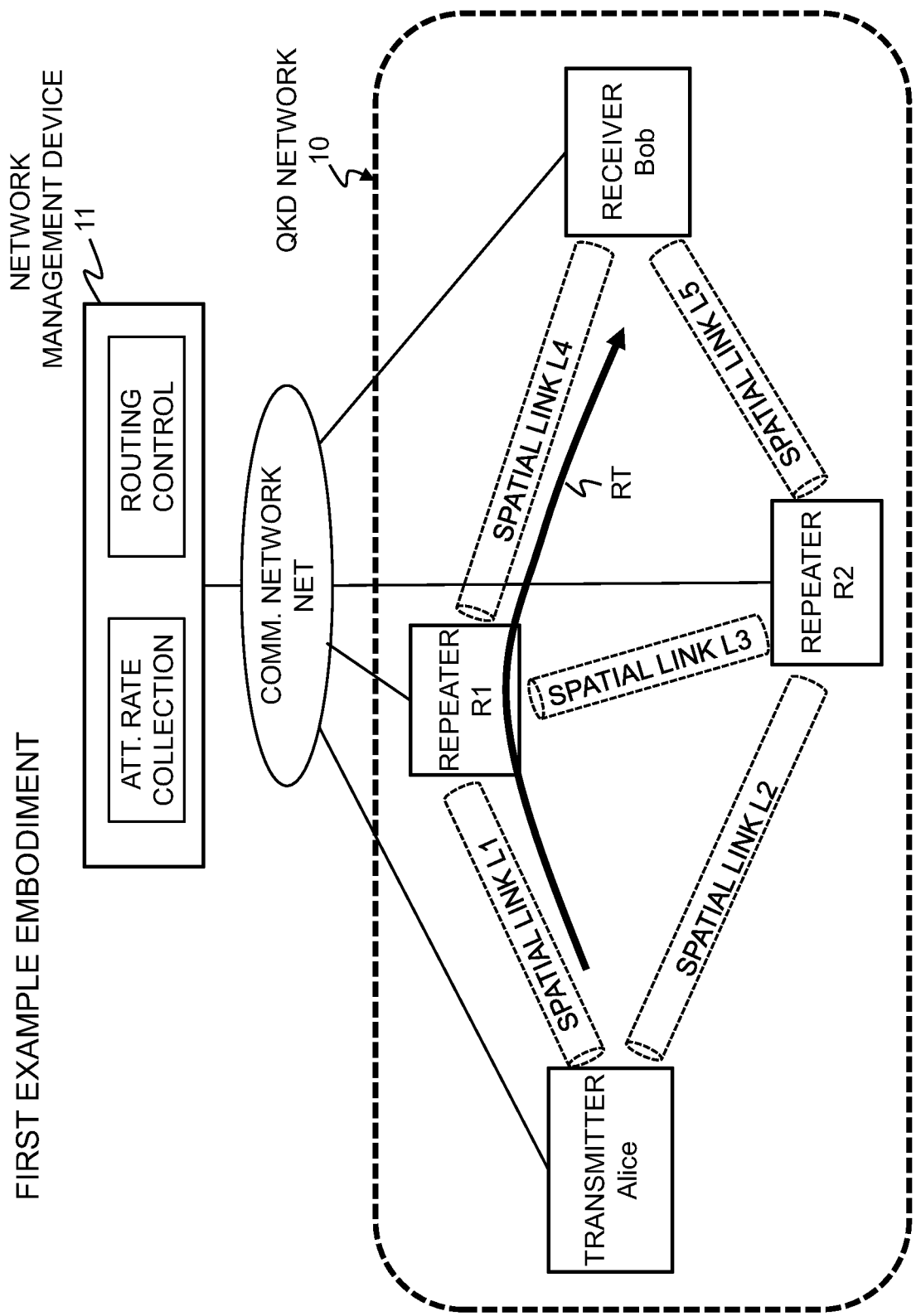
FIG. 1 is a diagram illustrating the schematic configuration of a quantum cryptographic communication system according to a first example embodiment of the present disclosure.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with other embodiments.

Overview of Example Embodiments

Hereinafter, free space is exemplified as an optical transmission line susceptible to the environment. In a quantum cryptographic communication system according to illustrative embodiments of the present disclosure, such an optical transmission line between nodes constituting a network is referred to as a spatial link. A transmitter transmits signal light of weak intensity and reference light of normal intensity to the network. The weak signal light has quantum states and the reference light has no quantum states. The signal light and the reference light are transferred to a receiver through a route selected in the network. A repeater device on the selected route amplifies only the reference light at a controlled gain and transfers the signal light and the amplified reference light to a downstream node. The receiver detects signal information by interring the received signal light and the received reference light.

The route through which the signal light and the reference light are transferred are selected based on the link state (attenuation rate or transmission rate) of each spatial link. The route selection (hereinafter, referred to as "routing" as appropriate) may be performed by the network management device referring to the link state of each spatial link. Alternatively, the routing may be performed by each node referring to link states detected at its own node and its neighboring nodes. In this manner, the route with the optimal link state (lowest attenuation rate or highest transmission rate), i.e., the route with the lowest route cost, can be selected. Hereinafter, the link state is assumed to be an attenuation rate.

As the attenuation rate of a spatial link becomes larger, the optical amplification factor of reference light is increased accordingly, allowing the signal level at the receiver to be maintained within a predetermined range. Accordingly, even in the case of the spatial link which has a large attenuation rate and is easily affected by environment, an improvement in SN ratio in homodyne detection and the stabilization of signal outputs can be achieved at the receiver.

The attenuation rate of each spatial link can be measured by transmitting probe light to the spatial link connecting adjacent nodes. In an optical transmission line susceptible to environmental influences such as free space, the attenuation characteristic indicating how the light intensity attenuates with distance is important. According to illustrative example embodiments, the attenuation rate (or transmission rate) indicating the degree of attenuation (or transmission) is measured as a propagation characteristic. In the case of using an attenuation rate as the propagation characteristic, the received light intensity $P_R$ is represented by $P_R = \gamma P_S$, where $P_S$ is the light intensity at a transmitter, $P_R$ is the light intensity at a receiver, and $\gamma(0 \leq \gamma \leq 1)$ is a transmission rate. In this case, the attenuation rate is represented by $(1-\gamma)$.

The method of measuring attenuation rates is not limited. Probe light may be transmitted from one of the neighboring nodes to the other to measure the attenuation rate at the other node. One node may also measure the attenuation rate of the spatial link using the probe light reflected from the other node. Alternatively, one node may receive the probe light from the other node to measure the attenuation rate.

The embodiments and examples of the present disclosure will be described in detail below with reference to the drawings. It should be noted that the components described in the following embodiments and examples are merely examples, and are not intended to limit the technical scope of the invention to them.

1. Network

As illustrated in FIG. 1, a quantum cryptographic communication network according to a first example embodiment of the present disclosure includes a QKD network 10, a network management device 11, and a communication network NET. The QKD network 10 has a configuration such that a plurality of nodes are connected by spatial links. The plurality of nodes may include a transmitter (Alice), a receiver (Bob), and a plurality of repeater devices connecting the transmitter (Alice) and the receiver (Bob).

For simplicity of explanation, it is assumed hereinafter that two repeater devices R1 and R2 are provided between the transmitter (Alice) and the receiver (Bob). Here, the transmitter (Alice) is connected to the repeater devices R1 and R1 by spatial links L1 and L2, respectively. The repeater devices R1 and R1 are connected by a spatial link L3. Further, the repeater devices R1 and R1 are connected to the receiver (Bob) by spatial links L4 and L5, respectively. The communication network NET is a classical network capable of normal packet communication or the like and connects to the nodes of the QKD network 10 and the network management device 11, allowing communications between nodes and between each node and the network management device 11.

The network management device 11 has a function of collecting the attenuation rate $(1-\gamma)$ of each spatial link in the network and a function of controlling the optical amplification factor of reference light at each repeater device based on the collected attenuation rates. Optical amplification of the reference light improves the SN (signal-to-noise) ratio in homodyne detection at the receiver (Bob) and stabilizes the signal output. The network management device 11 may also select the optimal route (e.g., a route RT in FIG. 1) that minimizes the total attenuation rate (cost) in the QKD network 10 by referring to the collected attenuation rates.

The transmitter (Alice) transmits weak signal light $P_Q$ with quantum states and normal-intensity reference light $P_{LO}$ without quantum states to the repeater device R1 through the spatial link L1 on the route RT. The repeater device R1 optically amplifies only the reference light $P_{LO}$ and transmits the signal light $P_Q$ and the amplified reference light $P_{LO}$ to the receiver (Bob) through the spatial link L4. The receiver (Bob) detects signal information by interfering the received signal light $P_Q$ and the received reference light $P_{LO}$.

The detailed configuration and functions of the repeater device R, the transmitter (Alice), the receiver (Bob) and the network management device 11 will be described below.

2. First Example

According to the first example of the present disclosure, probe light is transmitted in one direction on a spatial link between nodes to detect the optical attenuation rate of the spatial link in question. Based on the detected optical attenuation rate, the optical amplification factor of the reference light is controlled and the route selection of the spatial link is performed.

2.1) Repeater Device

A plurality of repeater devices (R1 and R2 in FIG. 1) have basically the same configuration but the different number of spatial links on input/output side. In the following description, a repeater device as generally described will be referred to as a repeater device R, and it is assumed that the repeater device R has a plurality of spatial links accommodated on its input and output sides. It goes without saying that an optical switch is not necessary if a single spatial link is accommodated.

Figure 2:
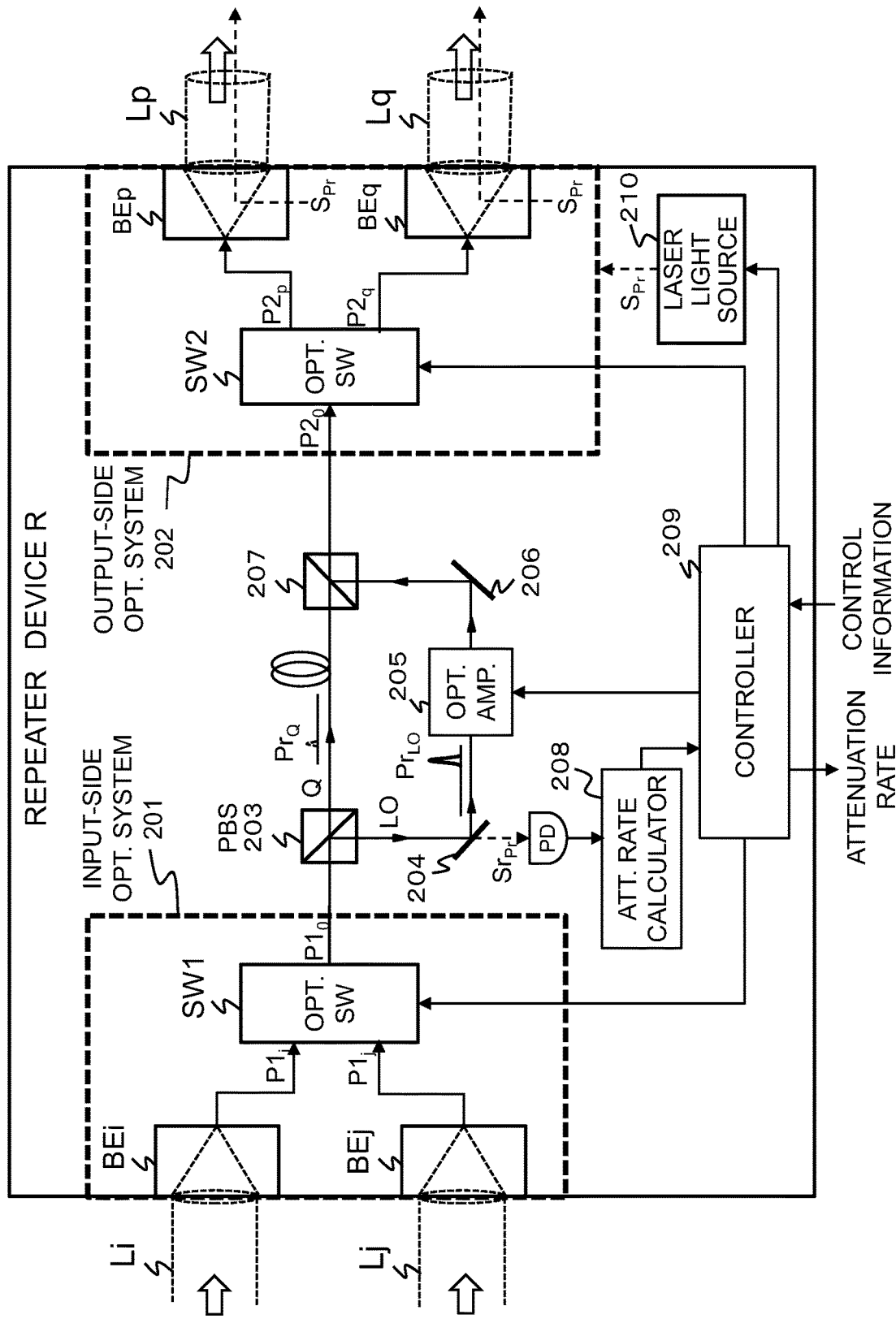
FIG. 2 is a block diagram illustrating the structure of a repeater device according to a first example of the disclosure.

As illustrated in FIG. 2, the repeater device R has an input-side optical system 201 and an output-side optical system 202, which may be collectively referred to as an optical route selector. The input-side optical system 201 accommodates n (n≥1) input-side spatial links. For convenience, spatial links Li and Lj are described here. One spatial link or multiple spatial links may be provided.

The input-side optical system 201 includes beam expanders BEi and BEj and optical switch SW1. The beam expanders BEi and BEj are installed so that their optical axes are aligned with the output-side optical systems of the upstream adjacent nodes, respectively. The output-side optical systems of the upstream adjacent nodes are connected through the spatial links Li and Lj, respectively. The output port of the beam expander BEi is optically connected to the input port $P1_i$ of the optical switch SW1 through optical fiber, and the output port of the beam expander BEj is optically connected to the input port $P1_j$ of the optical switch SW1 through optical fiber. The optical switch SW1 selects one optical signal from its multiple input ports and outputs it to the output port $P1_O$ as described below. Thus, the optical switch SW1 can select one of the input-side spatial links Li and Lj.

The output-side optical system 202 includes an optical switch SW2 and transmitting-side optical systems BEp and BEq. The output ports $P2_p$ and $P2_q$ of the optical switch SW2 are optically connected respectively to the input ports of the transmitting-side optical systems BEp and BEq through optical fiber. The transmitting-side optical system BEp and BEq are installed so that their optical axes are aligned with the input-side optical systems of the downstream adjacent node, respectively. The input-side optical systems of the downstream adjacent node are connected through the spatial links Lp and Lq, respectively. The optical switch SW2 outputs optical signals from the input ports to one of the output ports $P2_p$ and $P2_q$ as described below. Thus, the optical switch SW2 can select one of the output spatial links Lp and Lq.

Furthermore, the transmitting-side optical systems BEp and BEq are equipped with a probe light transmitting mechanism, which transmits predetermined probe light $S_{pr}$ from the transmitting-side optical systems BEp and BEq to the spatial links Lp and Lq, respectively. The transmitting-side optical systems BEp and BEq including the transmitting mechanism of the probe light, are described below (see FIG. 3).

If disturbances such as air fluctuations in spatial links Li and Lj occur, the output light of the beam expander BEi or BEj may not be focused correctly on the core of the optical fiber. Also, disturbances such as water vapor and particulates in the spatial links Li and Lj may significantly reduce the intensity of the output light of the beam expander BEi or BEj. According to this example, the attenuation rate of the probe light $S_{pr}$ is measured and the received reference light is amplified according to the attenuation rate. Accordingly, the reduction and fluctuation of the received intensity due to disturbances can be canceled out. Details will be described below.

Referring to FIG. 2, the repeater device R includes the input-side optical system 201 and the output-side optical system 202, and further a signal transfer section (203-207), a probe detection section (PD and 208), a controller 209, and a laser light source 210. The laser light source 210 emits probe light. The signal transfer section includes a signal optical system and a reference optical system. The signal optical system includes a polarizing beam splitter 203 and an unpolarizing beam splitter 207. The reference optical system includes the polarizing beam splitter 203, a dichroic mirror (DM) 204, an optical amplifier 205, a mirror 206, and the unpolarizing beam splitter 207. The probe detection section includes the DM 204, the photodetector PD, and an attenuation rate calculator 208. Since the attenuation rate is an example of the link state, the probe detection section may be also referred to as a link state detector.

The output port $P1_O$ of optical switch SW1 is connected to the input port of the polarizing beam splitter 203 through the optical fiber. The polarizing beam splitter 203 inputs a received reference light pulse $Pr_{LO}$ and a received signal light pulse $Pr_Q$ and received probe light $Sr_{pr}$ from the optical switch SW. As described below, the polarization planes of the received reference light pulse $Pr_{LO}$ and the received signal light pulse $Pr_Q$ are orthogonal to each other.

The received signal light pulse $Pr_Q$ passes through the polarizing beam splitter 203 and the unpolarizing beam splitter 207 as it is, and enters the input port $P2_O$ of the optical switch SW2 in the output-side optical system 202. On the other hand, the received reference light pulse $Pr_{LO}$ is reflected by the polarizing beam splitter 203 and then the dichroic mirror (DM) 204 to the optical amplifier 205. The DM 204 is configured to transmit light of wavelength λ2 and reflect light of other wavelengths (including λ1), as described below. The optical amplifier 205 is an EDFA or SOA, for example, and amplifies the received reference light pulse $Pr_{LO}$ while maintaining its wavelength and phase. The received reference light pulse $Pr_{LO}$, which has been optically amplified by the optical amplifier 205, is reflected by the mirror 206 and then the unpolarizing beam splitter 207 to the input port $P2_O$ of the optical switch SW2 in the output-side optical system 202.

As described in detail below, the transmitter (Alice) transmits reference light pulse $P_{LO}$ and signal light pulse $P_Q$ as a double pulse (two successive pulses) having a predetermined time difference. The receiver (Bob) detects signal information by interfering the received signal light $P_Q$ with the received reference light $P_{LO}$. Accordingly, it is necessary to maintain the time difference between the reference light pulse $P_{LO}$ and the signal light pulse $P_Q$ at each repeater device R on the route. In FIG. 2, a signal optical path Q and a reference optical path LO between the polarizing beam splitter 203 and the unpolarizing beam splitter 207 are set to the same optical path length. The unpolarizing beam splitter 207 may be a polarizing beam splitter that provides the same effect. In this case, all the reference light pulse $P_{LO}$ is reflected by the polarizing beam splitter (207) and all the signal light pulses $P_Q$ passes through the polarizing beam splitter (207).

The received probe light $Sr_{pr}$ has the same polarization plane as the received reference light pulse $Pr_{LO}$ but a different wavelength λ2, as described below. Accordingly, the receive 3e probe light $Sr_{pr}$ is reflected by the polarizing beam splitter 203 and passes through the DM 204. The received probe light $Sr_{pr}$ passing through the DM 204 is detected by the photodetector PD, which outputs the detection signal to the attenuation rate calculator 208. The attenuation rate calculator 208 calculates the attenuation rate (1−γ) from the received intensity of the received probe light $Sr_{pr}$ obtained by the photodetector PD and the predetermined intensity of the transmitting-side probe light $S_{pr}$.

The attenuation rate (1−γ) reflects not only the transmission losses in the free-space spatial link, but also the intensity reduction of the received probe light $Sr_{pr}$ at the beam expander. The reason is that the attenuation of the received probe light $Sr_{pr}$ can also be caused by misalignment of the focus of the output light of the beam expander due to free-space disturbances.

The controller 209 controls the optical gain of the optical amplifier 205. The optical amplifier 205 amplifies the received reference optical LO at the optical gain which is determined according to the attenuation factor (1−γ), thereby maintaining the signal level of the signal output $I_{out}$ at the receiver (Bob) within a predetermined range. The controller 209 may prepare a function determined by measurement in advance, which is used to calculate the optical gain as a function of the attenuation rate $(1-\gamma)$. Alternatively, a correspondence table between the attenuation factor $(1-\gamma)$ and the gain may be prepared by measurement in advance, and the optical gain for an attenuation rate $(1-\gamma)$ may be obtained by referring to the correspondence table. The control of the optical gain of the optical amplifier 205 may be performed when the attenuation rate $(1-\gamma)$ or the amount of change in attenuation rate exceeds a predetermined threshold value. The controller 209 may perform the optical gain control of the optical amplifier 205 according to the control information received from the network management device 11.

Furthermore, the controller 209 performs switching control of the input-side optical switch SW1 and the output-side optical switch SW2. In this example, the input-side optical switch SW1 and the output-side optical switch SW2 are switched according to switching control information received from the network management device 11 to select the input-side and output-side spatial links with the lowest route cost.

The functions of the attenuation rate calculator 208 and the controller 209 as described above may also be realized by executing programs stored in a memory device (not shown) on one or more processor or CPU (Central Processing Unit).

2.2) Detection Mechanism of Optical Attenuation Rate

Figure 3:
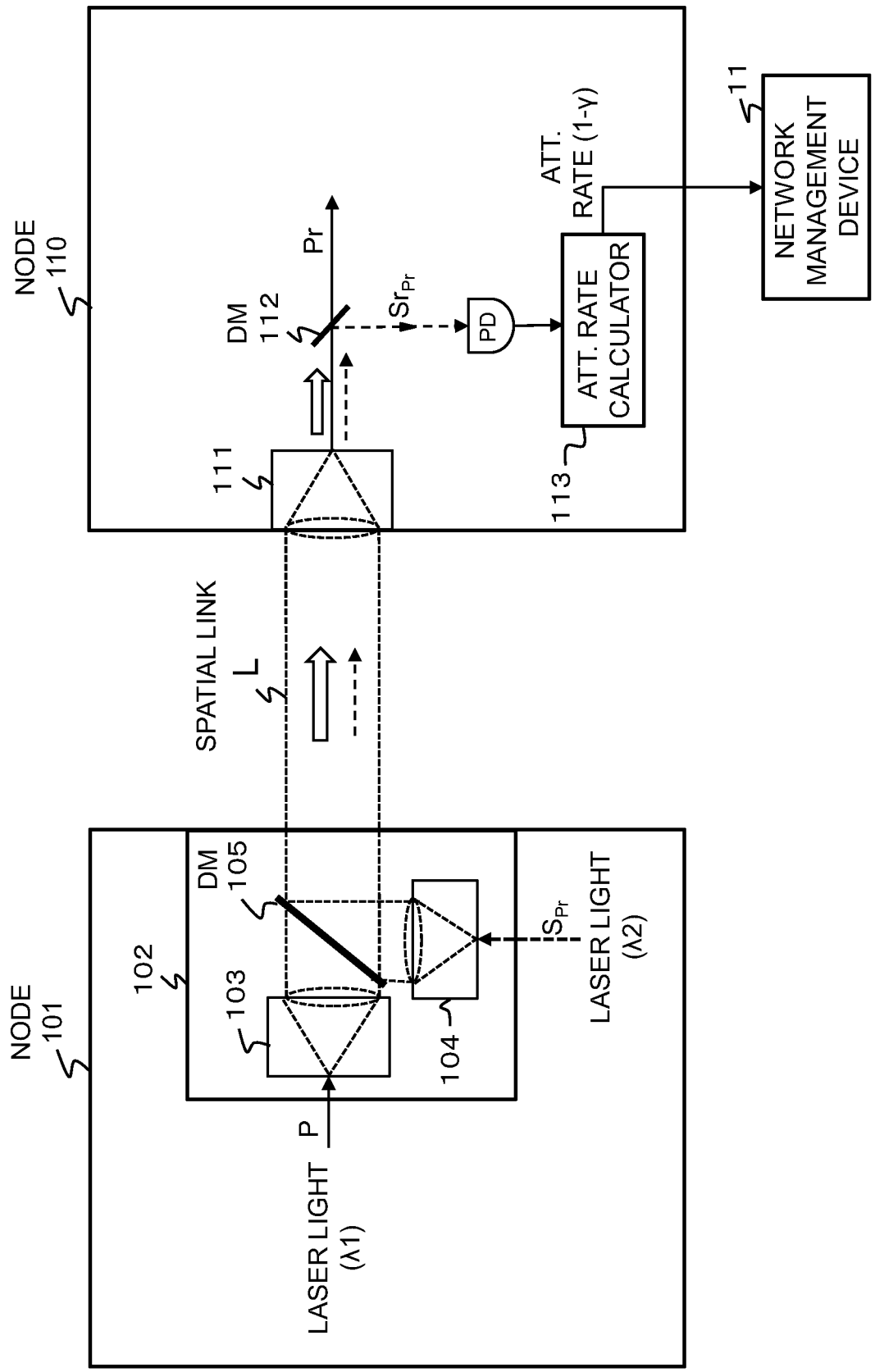
FIG. 3 is a diagram illustrating the schematic configuration of a system for explaining an example of the attenuation rate detection method in the first example.

As illustrated in FIG. 3, it is assumed that adjacent node 101 and 110 are connected to each other through an arbitrary spatial link L. The node 101 has a transmitting-side optical system 102, which outputs laser light P of wavelength $\lambda 1$ and probe light $Sr_{pr}$ of wavelength $\lambda 2$ to the spatial link L. The probe light $Sr_{pr}$ is laser light of wavelength $\lambda 2$ having a predetermined pulse width or a predetermined duration and controlled intensity. The configuration of the transmitting-side optical system 102 may be employed for each of the transmitting-side optical systems BEp and BEq in FIG. 2.

The transmitting-side optical system 102 includes beam expanders 103 and 104 and a dichroic mirror (DM) 105. The beam expanders 103 and 104 are an optical element that convert a light beam input from an optical fiber on input port to a collimated light beam of a larger diameter. The DM 105 in the present example is configured to transmit a light beam of wavelength $\lambda 1$ and reflect a light beam of other wavelengths (including wavelength $\lambda 2$). Accordingly, the laser light P of wavelength $\lambda 1$ (here, the reference light pulse $P_{LO}$ and signal light pulse $P_Q$) passes through the DM 105 and the probe light $S_{pr}$ of wavelength $\lambda 2$ is reflected by the DM 105.

The beam expanders 103 and 104 are positioned on the plane defined by their optical axes so that their optical axes are orthogonal. The DM 105 is positioned in an inclined posture such that it is inclined 45° counterclockwise to the traveling direction of the outgoing light from the beam expander 103 and clockwise to the traveling direction of the outgoing light from the beam expander 104. Accordingly, the light of wavelength $\lambda 1$ input from beam expander 103 passes through the DM 105 to the spatial link L, while the light of wavelength $\lambda 2$ input from the beam expander 104 is reflected by the DM 105 to the spatial link L.

The node 110 includes a receiving-side optical system composed of a beam expander 111 and a DM 112. The beam expander 111 receives the laser light Pr of wavelength $\lambda 1$ and the probe light $Sr_{Pr}$ of wavelength $\lambda 2$ arriving through the spatial link L. The DM 112 in the present example is an optical element that separates the laser light Pr from the probe light $Sr_{Pr}$ and is configured to pass through the light of wavelength $\lambda 1$ and reflect the light of other wavelengths (including $\lambda 2$). Accordingly, the laser light Pr of wavelength $\lambda 1$ transmits through the DM 112, while the probe light $Sr_{Pr}$ of wavelength $\lambda 2$ is reflected by the DM 112.

The received probe light $Sr_{Pr}$ reflected by the DM 112 is detected by the photodetector PD which outputs the detection signal to the attenuation rate calculator 113. The attenuation rate calculator 113 calculates the attenuation rate $(1-\gamma)$ from the received intensity of the received probe light $Sr_{Pr}$ obtained by the photodetector PD and the predetermined intensity of the transmitting-side probe light $S_{Pr}$. The attenuation rate $(1-\gamma)$ is notified to the network management device 11.

The attenuation rate $(1-\gamma)$ reflects not only the transmission losses in the spatial link L, but also the intensity reduction of the received probe light $Sr_{Pr}$ at the beam expander 111. In other words, the attenuation of the received probe light $Sr_{Pr}$ may be caused by misalignment of the focusing position of the output light of the beam expander 111 due to disturbances in the spatial link L, as described above.

2.3) Optical Switch Mechanism

The optical switch SW1 on the input side and the optical switch SW2 on the output side of the repeater device R may be a switch element capable of switching optical paths. Hereafter, the optical switches SW1 and SW2 are collectively referred to as optical switch SW. Assuming that n and m are arbitrary integers, the optical switch SW is an n-input, one-output switch element or a one-input, m-output switch element. An example of such an optical switch SW will be shown below.

Example 1

Figure 4:
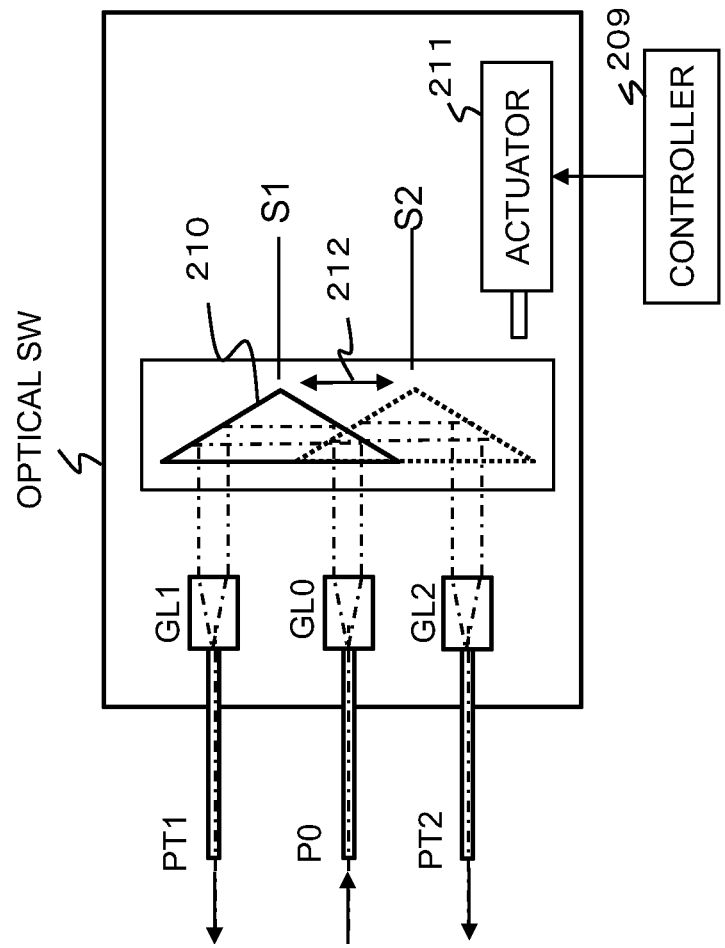
FIG. 4 is a block diagram illustrating a first example of the optical switch in the repeater device of FIG. 3.

As illustrated in FIG. 4, the optical switch SW is a one-input, two-output optical switch with a movable prism. The optical switch SW has one input port P0 and two output ports PT1 and PT2. The ports P0, PT1 and PT2 are connected to GRIN (Graded-Index) lenses GL0, GL1 and GL2, respectively. These GRIN lenses are positioned opposite to a prism 210. The prism 210 has an isosceles-triangular cross section and is slidable in the direction of the base (as indicated by arrow 212). An actuator 211 moves the prism 210 to either position S1 or position S2 under the control of the controller 209.

When the prism 210 is positioned at S1, the laser beam coming in from the input port P0 is collimated by the GRIN lens GL0 and then total-reflected by the two equal sides of the prism 210 to the GRIN lens GL1. The laser beam focused by the GRIN lens GL1 is emitted from the output port PT1. In other words, the prism 210 at position S1 causes the input port P0 to connect to the output port PT1. Similarly, the prism 210 at position S2 causes the input port P0 to connect to the output port PT2. Thus, by moving the prism 210, an output port can be selected from the output ports PT1 and PT2.

Example 2

Figure 5:
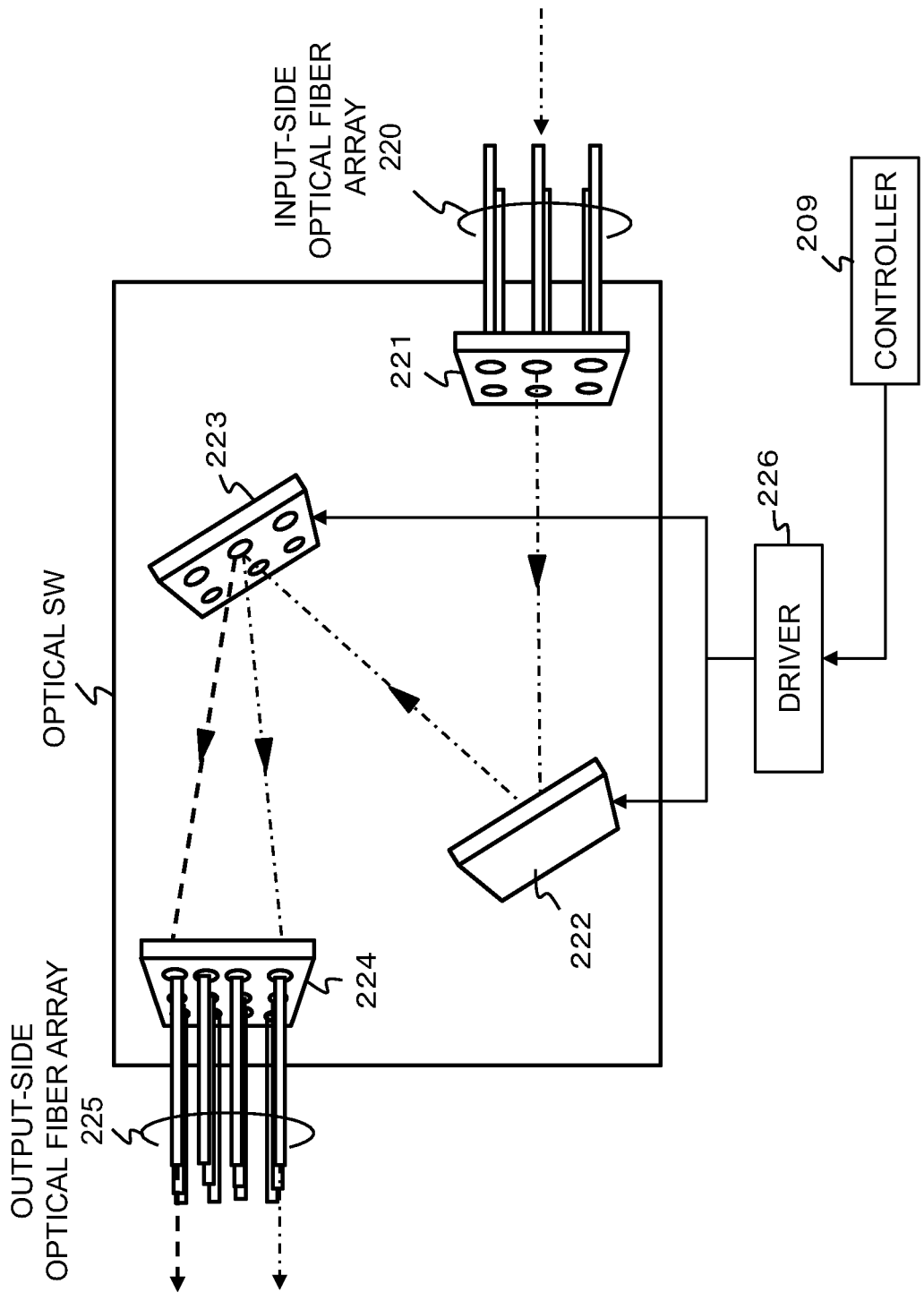
FIG. 5 is a block diagram illustrating a second example of the optical switch in the repeater device of FIG. 3.

As illustrated in FIG. 5, the optical switch SW is an n-input m-output optical switch using a MEMS (Micro Electro Mechanical System) mirror array. The laser light coming in from any optical fiber of an input-side optical fiber array 220 is collimated by a micro-lens array 221. The collimated laser light is reflected through MEMS mirror arrays 222 and 223 to a micro-lens array 224, which focuses the collimated laser light onto an output-side optical fiber array 225. A drive 226 precisely controls the tilt angle of each MEMS mirror in the MEMS mirror arrays 222 and 223 under the control of the controller 209. Such mirror control allows the reflected light at each MEMS mirror to be deflected so that the laser light input from any input-side optical fiber can reach any micro lens of the micro-lens array 224. By precisely controlling the tilt angle of the MEMS mirrors in this way. it is possible to connect any input optical fiber to any output optical fiber.

Example 3

Figure 6:
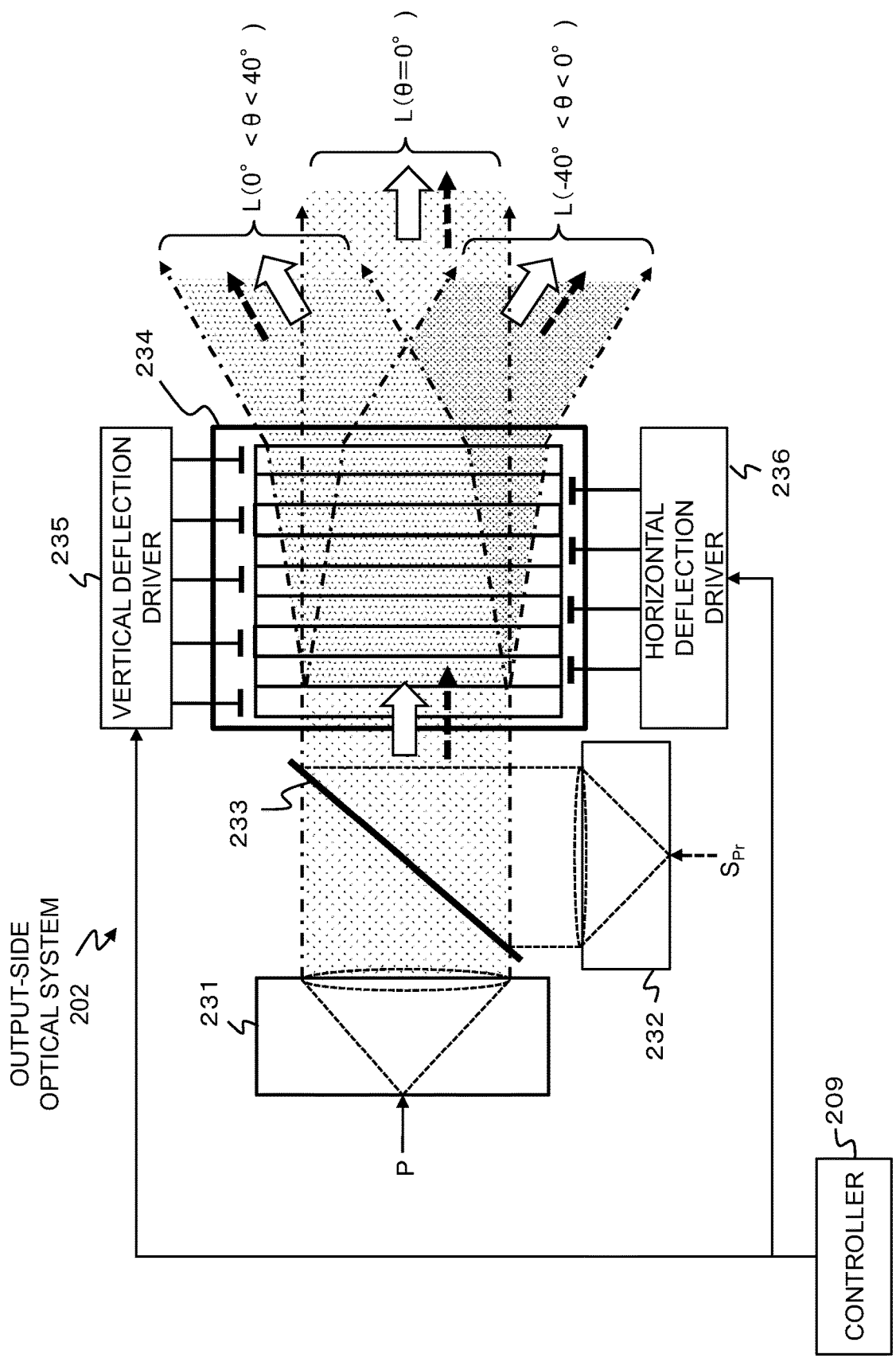
FIG. 6 is a block diagram illustrating a third example of the optical switch in the repeater device of FIG. 3.

FIG. 6 is another example of the output-side optical system 202 as shown in FIG. 2, which can realize the same function as the optical switch SW by incorporating beam expanders and a deflector. Beam expanders 231, 232, and DM 233 in FIG. 6 correspond to beam expanders 103, 104, and DM 105 of the transmitting-side optical system 102 in FIG. 3, respectively, and have equivalent functions. An optical deflector 234 can deflect a transmission beam in the desired direction by means of a vertical deflection driver 235 and a horizontal deflection driver 236. Such an optical deflector 234 may employ a deflector using electro-optic effect or acousto-optic effect.

The laser light P of wavelength $\lambda 1$ (here, reference light pulse Pw and signal light pulse $P_Q$) is expanded in beam diameter by the beam expander 231 and then passes through the DM 233 to enter the optical deflector 234. The probe light $S_{Pr}$ of wavelength $\lambda 2$ is expanded in beam diameter by the beam expander 232 before entering the DM 233, which reflects the expanded probe light $S_{Pr}$ to the optical deflector 234. In this manner, the expanded probe light $S_{Pr}$ is transmitted in the same direction as the laser light P.

The optical deflector 234 can deflect the laser light P and probe light $S_{Pr}$ in a plurality of directions. In this example, the laser light P and probe light $S_{Pr}$ are sent to one spatial link selected from the plurality of spatial links L. In the example shown in FIG. 6, three spatial links can be selected: spatial link L in the direction of deflection angle $\theta=0°$; spatial link L in the direction of deflection angle $0°<\theta<400$; and spatial link L in the direction of deflection angle $-40°<\theta<0°$.

2.4) Transmitter

Figure 7:
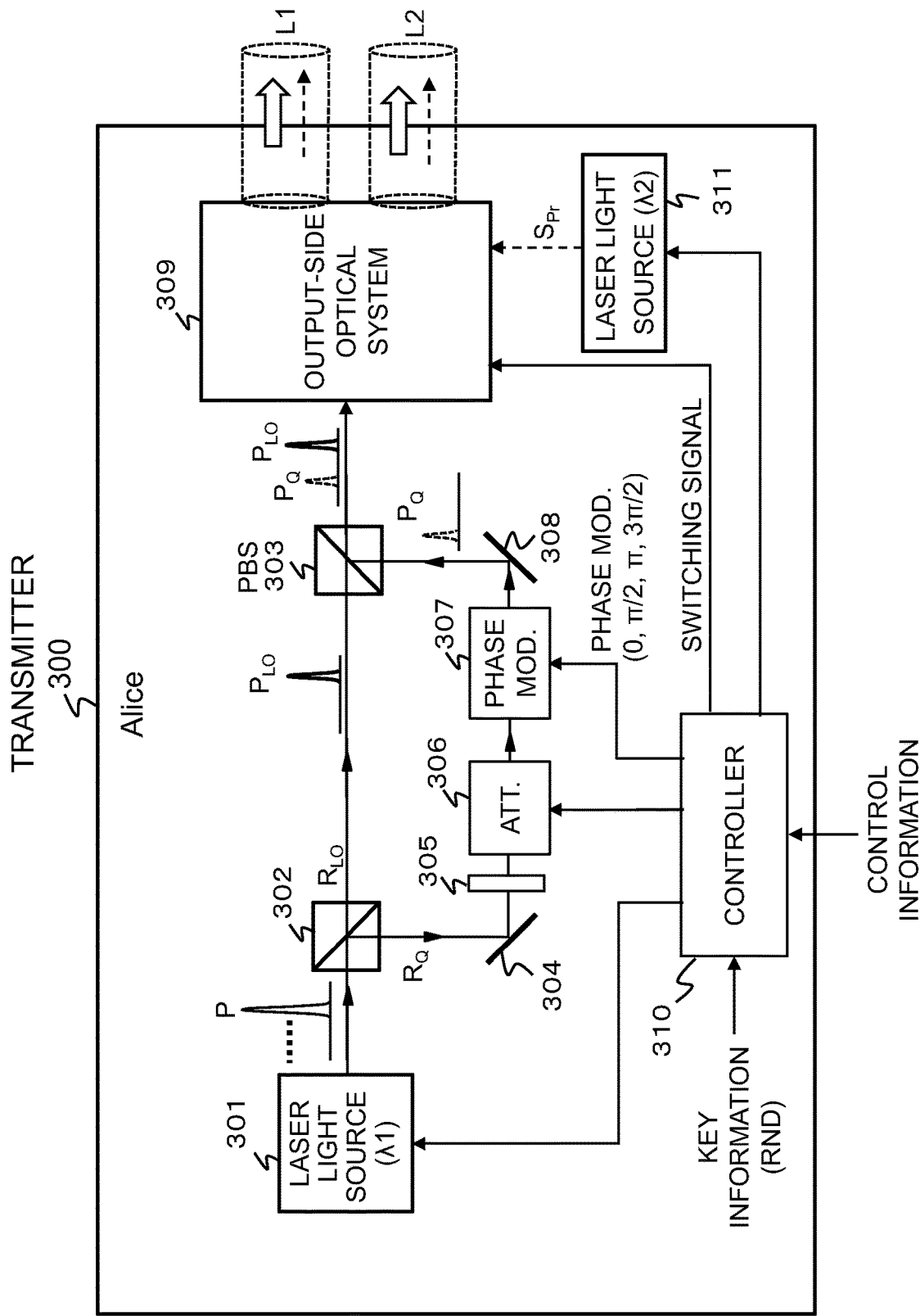
FIG. 7 is a block diagram illustrating the configuration of a transmitter (Alice) in the quantum cryptographic communication network according to the first example of the present disclosure.

As illustrated in FIG. 7, a transmitter 300 corresponds to the transmitter (Alice). The transmitter 300 includes an optical signal system (301-308), an output-side optical system 309 including an optical probe system, and a controller 310. The transmitter 300 further includes a laser light source 311 that generates probe light $S_{Pr}$ to output it to the output-side optical system 309. The output-side optical system 309 including the optical probe system may employ the output-side optical system 202 as illustrated in FIGS. 2 and 3 or FIG. 6.

The optical signal system includes a laser light source 301, an unpolarizing light beam splitter (BS) 302, a polarizing light beam splitter (PBS) 303, a mirror 304, a half-wave plate 305, an attenuator 306, a phase modulator 307, and a mirror 308. As described below, the optical signal system generates a reference light pulse $P_{LO}$ and a signal light pulse $P_Q$ from a transmission light pulse P of the laser light source 101. The reference light pulse $P_{LO}$ and the signal light pulse $P_Q$ have polarization planes orthogonal to each other and are separated in time. The reference light pulse $P_{LO}$ and the signal light pulse $P_Q$ are output to the spatial link L1 or L2, which is selected by the output-side optical system 309.

The optical probe system includes the laser light source 311, which emits linearly polarized probe light $S_{Pr}$ as with the laser light source 301. The probe light $S_{Pr}$ is output to the spatial link L1 or L2, which is selected by the output-side optical system 309. The probe light $S_{Pr}$ may be a light pulse of predetermined pulse width or a laser light beam that lasts for a certain length of time. The laser light source 301 emits laser light of wavelength $\lambda 1$ and the laser light source 311 emits laser light of wavelength $\lambda 2$ different from the wavelength $\lambda 1$.

The output-side optical system 309 may employ the output-side optical system 202 composed of the optical switch SW1, the transmitting-side optical systems EBp and EBq as illustrated in FIG. 2 or the output-side optical system 202 as illustrated in FIG. 6. The probe light $S_{Pr}$ emitted by the laser light source 311 is output, along with the reference light pulse $P_{LO}$ and the signal light pulse $P_Q$, to a selected one of the spatial links L1 and L2.

The controller 310 controls the laser light source 301, the attenuator 306, and the phase modulator 307 to generate two successive pulses of a reference light pulse $P_{LO}$ and a signal light pulse $P_Q$ as described above. The controller 310 also controls the laser light source 311 to output the probe light $S_{Pr}$ at predetermined periods or at a desired timing. The controller 310 also controls the switching of spatial links of the output-side optical system 309 according to the control information received from the network management device 11.

The laser light source 301 outputs a linearly polarized light pulse P of wavelength $\lambda 1$ to the input port of the unpolarizing light beam splitter 302. Each light pulse P is split into two light pulses by the unpolarizing beam splitter 302. One light pulse is sent to a reference-side route $R_{LO}$ and the other light pulse is sent to the signal-side route $R_Q$. The light pulse on the reference-side route $R_{LO}$ is a normal-intensity reference light pulse $P_{LO}$ having no quantum states. The reference light pulse $P_{LO}$ passes through the polarizing beam splitter 103 as it is, and enters the output-side optical system 309.

The signal-side route $R_Q$ includes the mirror 304, the half-wave plate 305, the attenuator 306, the phase modulator 307, and the mirror 308. The signal-side route $R_Q$ has a longer optical path than the reference-side route $R_{LO}$. The half-wave plate 305 rotates the plane of polarization of the light pulse on the route $R_Q$ by 90 degrees. The attenuator 306 attenuates the light pulse to output a weak light pulse having quantum states. The phase modulator 307 performs phase modulation on the weak light pulse to generate the signal light pulse $P_Q$. The signal light pulse $P_Q$ is reflected by the mirror 308 to the polarizing beam splitter 303. The attenuator 306 and phase modulator 307 may be arranged in reverse order with respect to the traveling direction of the light pulse.

The polarization plane of the signal light pulse $P_Q$ is rotated by 90 degrees by the half-wave plate 105. Accordingly, the signal light pulse $P_Q$ is reflected by the polarizing beam splitter 303 to the output-side optical system 309. However, the signal light pulse $P_Q$ enters the output-side optical system 309 behind the reference light pulse $P_{LO}$ by a time delay caused by the difference in optical length between the routes $R_Q$ and $R_{LO}$. Thus, from a single light pulse P, a reference light pulse $P_{LO}$ and a signal light pulse $P_Q$ are generated, which are orthogonal in polarization plane to each other and separated in time. In the case where the unpolarizing beam splitter 302 is replaced with a polarizing beam splitter, the half-wave plate 105 can be eliminated.

The phase modulator 307, under the control of the controller 310, performs four different phase modulations (0°, 90°, 180°, 270°) on each weak light pulse output from the attenuator 106 according to original random numbers of a cryptographic key to generate the signal light pulse $P_Q$. Thus, two successive pulses are generated as a double pulse, which includes a normal-intensity reference light pulse $P_{LO}$ and a phase-modulated signal light pulse $P_Q$. A train of double pulses enters the output-side optical system 309.

In this way, the controller 310 controls the switching of the output-side optical system 309, allowing transmission of the double pulse of wavelength λ1 including reference light pulse $P_{LO}$ and signal light pulse $P_Q$ and the probe light $S_{Pr}$ of wavelength λ2 lasting for a given time at a given timing through the selected spatial link.

The above-described functions of the controller 310 may be implemented by executing programs stored in a memory (not shown) on one or more processor or CPU.

2.5) Receiver

Figure 8:
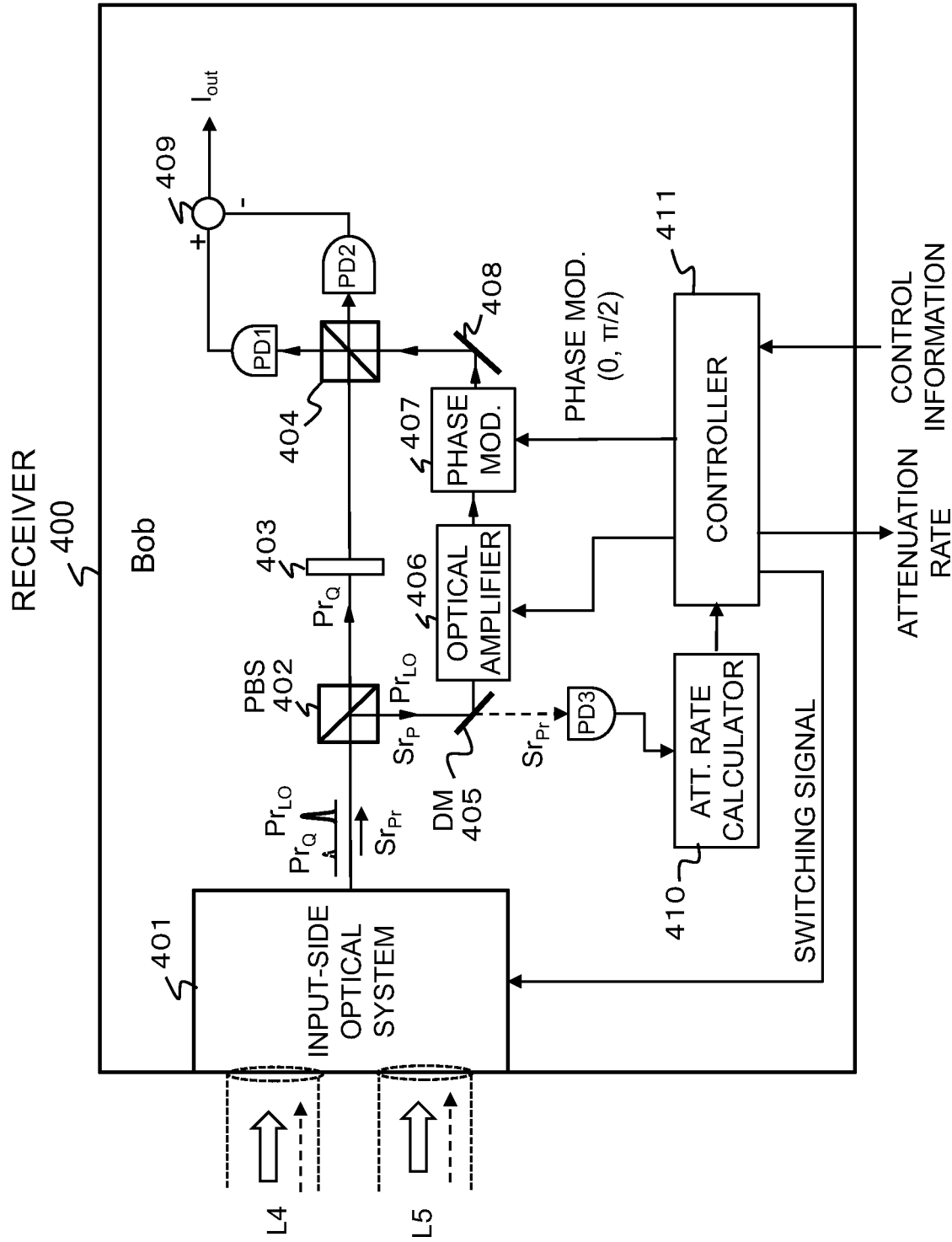
FIG. 8 is a block diagram illustrating the configuration of a receiver (Bob) in the quantum cryptographic communication network according to the first example of the present disclosure.

As illustrated in FIG. 8, a receiver 400 corresponds to the above-described receiver (Bob). The receiver 400 inputs reference light pulse $P_{LO}$, signal light pulse $P_Q$ and probe light $S_{Pr}$ from an upstream adjacent node through the spatial link L4 or L5 selected by an input-side optical system 401. The input-side optical system 401 is assumed to have the same configuration as the input-side optical system 201 illustrated in FIG. 2.

Referring to FIG. 8, the receiver 400 includes a signal reception section (402-409) and a probe detection section (PD3, 410) and a controller 411, in addition to the input-side optical system 401. The signal reception section includes an optical signal system, an optical reference system, and a signal detection section. The optical signal system includes a polarizing beam splitter 402, a half-wave plate 403, and an unpolarizing beam splitter 404. The optical reference system includes the polarizing beam splitter 402, a dichroic mirror (DM) 405, an optical amplifier 406, a phase modulator 407, a mirror 408 and the unpolarizing beam splitter 404. The signal detection section includes photodetectors PD1 and PD2 and a subtractor 409. The probe detection section includes the DM 405, a photodetector PD3, and attenuation rate calculator 410.

The output port of the input-side optical system 401 is optically connected to the input port of the polarizing beam splitter 402 through an optical fiber. The polarizing beam splitter 402 inputs the received reference light pulse $Pr_{LO}$, the received signal light pulse $Pr_Q$ and the received probe light $Sr_{Pr}$ from the input-side optical system 401. As described before, the polarization plane of the received reference light pulse $Pr_{LO}$ is orthogonal to that of the signal light pulse $Pr_Q$.

The received signal light pulse $Pr_Q$ passes through the polarizing beam splitter 402 as it is and enters the half-wave plate 403. Since the half-wave plate 403 rotates the polarization plane by 90 degrees, the received signal light pulse $Pr_Q$ transmitted through the half-wave plate 403 has the same polarization plane as the received reference light pulse $Pr_{LO}$. The received signal light pulse $Pr_Q$ transmitted through the half-wave plate 403 enters the first input port of the unpolarizing light beam splitter 404.

On the other hand, the received reference light pulse $Pr_{LO}$ is reflected by the polarizing beam splitter 402 to exit from the second output port of the polarizing beam splitter 402. The received reference light pulse $Pr_{LO}$ reflected from the polarizing beam splitter 402 is reflected by the mirror 405 to the second input port of the unpolarizing beam splitter 404 through the optical amplifier 406, the phase modulator 407 and the mirror 408. The received probe light $Sr_{Pr}$ is the probe light $S_{Pr}$ arriving from the laser light source 311 of the transmitter 300. Accordingly, the received probe light $Sr_{Pr}$ is reflected by the polarizing beam splitter 402 as with the received reference light pulse $Pr_{LO}$.

The DM 405 is configured to transmit light of wavelength λ2 and reflect light of other wavelengths (including λ1). Accordingly, the DM 405 reflects the reference light pulse $Pr_{LO}$ of wavelength λ1 and transmits the received probe light $Sr_{Pr}$ of wavelength λ2.

It should be noted that the route of the received signal light pulse $Pr_Q$ has the same length as the route $R_{LO}$ of the transmitter 300, and the route of the received reference light pulse $Pr_{LO}$ has the same length as the route $R_Q$ of the transmitter 300. Further, in the repeater device R illustrated in FIG. 2, the signal light route Q and the reference light route LO between the polarizing beam splitter 203 and the unpolarizing beam splitter 207 have the same optical path length. Accordingly, the received signal light pulse $Pr_Q$ and the received reference light pulse $Pr_{LO}$, which enter the first and second input ports of the unpolarizing beam splitter 404, respectively, reach the unpolarizing beam splitter 404 through different optical paths of the same length from the polarizing beam splitter 302 of the transmitter 300. The optical configuration of the transmitter 300 and receiver 400 thus constitutes an interferometer.

The optical amplifier 406 may employ, for example, an EDFA or SOA The optical amplifier 406 amplifies the received reference light pulse $Pr_{LO}$ while maintaining its wavelength and phase. The gain of the optical amplifier 406 is controlled by the controller 411. The phase modulator 407 phase-modulates the optically amplified, received reference light pulse $Pr_{LO}$.

The phase modulation of the phase modulator 407 is controlled by the controller 411. As described above, the phase modulator 307 of the transmitter 300 performs four different phase modulations (0°, 90°, 180°, 270°) on the signal light pulse $P_Q$ to be transmitted, while the phase modulator 407 of the receiver 400 performs two different phase modulations (0°, 90°) on the received reference light pulse $Pr_{LO}$. The received reference light pulse $Pr_{LO}$ thus phase-modulated is reflected by the mirror 408 to the unpolarizing beam splitter 404.

The unpolarizing beam splitter 404 inputs the received signal light pulse $Pr_Q$, whose polarization plane has been rotated by 90 degrees by the half-wave plate 403, and the received reference light pulse $Pr_{LO}$ that has been phase-modulated by the phase modulator 407. The unpolarizing beam splitter 404 has equal light transmittance and reflectance. Accordingly, the unpolarizing beam splitter 404 superimposes the received signal light pulse $Pr_Q$ and the received reference light pulse $Pr_{LO}$ to emit the resultant from the two output ports. The two output ports of the unpolarizing beam splitter 404 are optically connected to the photodetectors PD1 and PD2 through optical transmission lines, respectively. The photodetectors PD1 and PD2 receive two outgoing beams of light from the two output ports of the unpolarizing beam splitter 404, respectively. As described before, normal photodiodes may be used as the photodetectors PD1 and PD2 at room temperature.

The subtractor 409 performs subtraction calculation of detection signals output from the photodetectors PD1 and PD2, respectively, and outputs the resulting difference signal as a signal output $I_{out}$ obtained by homodyne detection.

On the other hand, the received probe light $Sr_{Pr}$ transmitted through the DM 405 is detected by the photodetector PD3, which outputs the detection signal to the attenuation rate calculator 410. The attenuation rate calculator 410 calculates the attenuation rate $(1-\gamma)$ from the received intensity of the received probe light $Sr_{pr}$ obtained by the photodetector PD3 and the predetermined intensity of the probe light $S_{Pr}$ on the transmitting side.

The attenuation rate $(1-\gamma)$ reflects not only transmission losses in the selected spatial link, but also the intensity reduction of the received probe light $Sr_p$ at the beam expander of the input-side optical system 401. In other words, the attenuation of the received probe light $Sr_{Pr}$ may be caused by misalignment of the focusing position of the output light of the beam expander due to disturbances in the spatial link as described above.

The controller 411 controls the route switching control of the input-side optical system 401, the phase control of the phase modulator 407 and the optical gain control of the optical amplifier 406. The route switching control is performed according to control information received from the network management device 11. The switching control of the optical switch (see FIG. 2) in the input-side optical system 401 allows selection of the spatial link L4 or L5.

As for optical gain control of the optical amplifier 406, the optical amplifier 406 amplifies the received reference light pulse $Pr_{LO}$ at an optical gain in response to the attenuation rate $(1-\gamma)$, thereby maintaining the signal level of the signal output $I_{out}$ within a predetermined range. The controller 411 may prepare a function previously determined by measurement and calculate the optical gain as a function of the attenuation rate $(1-\gamma)$. Alternatively, a correspondence table between the attenuation rate $(1-\gamma)$ and the gain may be experimentally prepared. The gain of the optical amplifier 14 for the attenuation rate $(1-\gamma)$ can be obtained by referring to the correspondence table. It should be noted that the control of the optical gain of the optical amplifier 406 may be performed when the attenuation rate $(1-\gamma)$ or its change exceeds a predetermined threshold value.

The above-described functions of the attenuation rate calculator 410 and the controller 411 may be implemented by executing programs stored in a memory (not shown) on one or more processor or CPU.

3. Second Example

According to a second example of the present disclosure, the optical attenuation rate of a spatial link between nodes is detected by the probe light traveling between the nodes. Based on the detected optical attenuation rate, the optical amplification factor of the reference light is controlled and the routing of the spatial links is performed. Hereafter, components similar to those of the first example described above are denoted by the same reference numerals and their descriptions will be simplified.

3.1) Repeater Device

Figure 9:
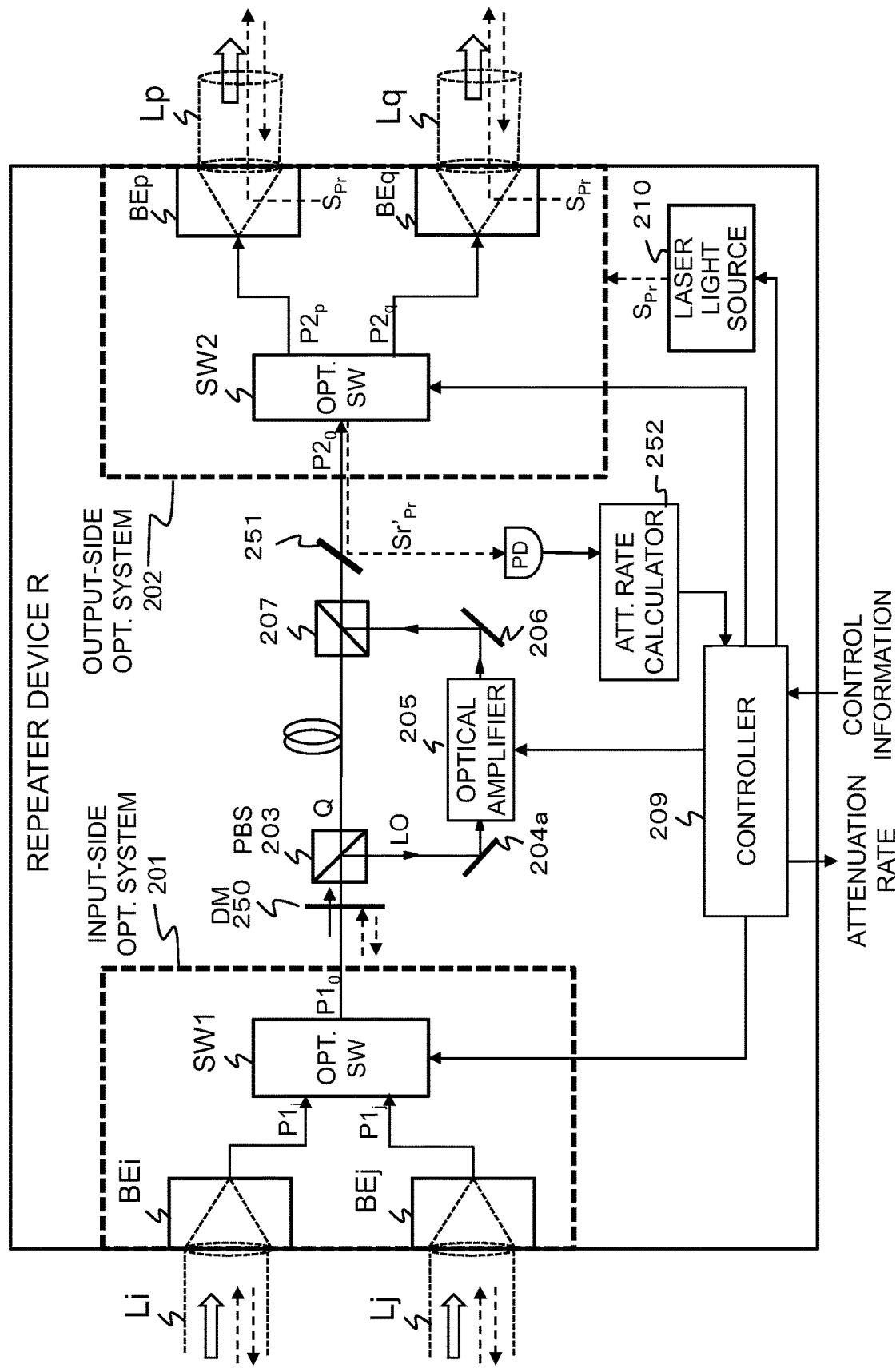
FIG. 9 is a block diagram illustrating the structure of a repeater device according to a second example of the disclosure.

As illustrated in FIG. 9, the repeater device R includes the input-side optical system 201 and the output-side optical system 202 which have the structure similar to the first example (see FIGS. 2 to 6). The signal transfer sections (reference numerals 203-207) also have the same configuration as in the first example, except for a mirror 204a. The mirror 204a does not need to be a dichroic mirror (DM) since it only needs to reflect the received reference light $Pr_{LO}$ in this example. The differences between the present example and the first example are as follows.

The repeater device R according to the present example has a dichroic mirror (DM) 250 between the input-side optical system 201 and the polarizing beam splitter 203. The DM 250 is configured to transmit light of wavelength $\lambda 1$ and reflect light of wavelength $\lambda 2$. Thus, the reference light pulse $P_{LO}$ and the signal light pulse $P_Q$ of wavelength $\lambda 1$ transmit through the DM 250, while the received probe light $Sr_{Pr}$ of wavelength $\lambda 2$ is reflected by the DM 250. The received probe light $Sr_{Pr}$ reflected by the DM 250 is returned to the transmitting node (upstream node) through the selected spatial link.

The repeater device R also has a dichroic mirror (DM) 251 between the unpolarizing beam splitter 207 and the output-side optical system 202. The DM 251, as with the DM 250, transmits the reference light pulse Pw and signal light pulse $P_Q$ of wavelength $\lambda 1$ and reflects the received probe light $Sr'_{Pr}$ of wavelength $\lambda 2$ reflected from a downstream node. The received probe light $Sr'_{Pr}$ reflected by the DM 251 enters the probe light detector PD, which outputs a detection signal to the attenuation rate calculator 252. The attenuation rate calculator 252 calculates the attenuation rate $(1-\gamma)$ from the received intensity of the received probe light $Sr'_{Pr}$ obtained by the photodetector PD and the predetermined intensity of the probe light $S_{Pr}$ emitted from the laser light source 210.

Since the probe light $S_{Pr}$ travels between the repeater device R and the downstream node through the spatial link, the intensity of the probe light $S_{Pr}$ emitted by the laser source 210 is controlled so that the reflected received probe light $Sr'_{Pr}$ is sufficiently large in intensity.

The controller 209 can control the optical gain of the optical amplifier 205 as in the first example according to the control information received from the network management device 11. Alternatively, the optical gain of the optical amplifier 205 may be controlled according to the optical attenuation factor $(1-\gamma)$ of the spatial link on the output side. Such gain control at the repeater device makes it possible to maintain the signal level of the signal output $I_{out}$ at the receiver (Bob) within a predetermined range.

Furthermore, the controller 209 performs switching control of the input-side optical switch SW1 and the output-side optical switch SW2 according to the optical attenuation rate of the spatial link. In this example, the input-side optical switch SW1 and output-side optical switch SW2 are switched according to the switching control information received from the network management device 11, allowing selection of the input-side and output-side spatial links with the lowest path cost.

The functions of the attenuation rate calculator 252 and controller 209 described above can also be realized by executing programs stored in a memory (not shown) on one or more processor or CPU.

3.2) Detection Mechanism of Optical Attenuation Rate

Detection mechanism of attenuation rate $(1-\gamma)$ according to the present example is as follows.

Figure 10:
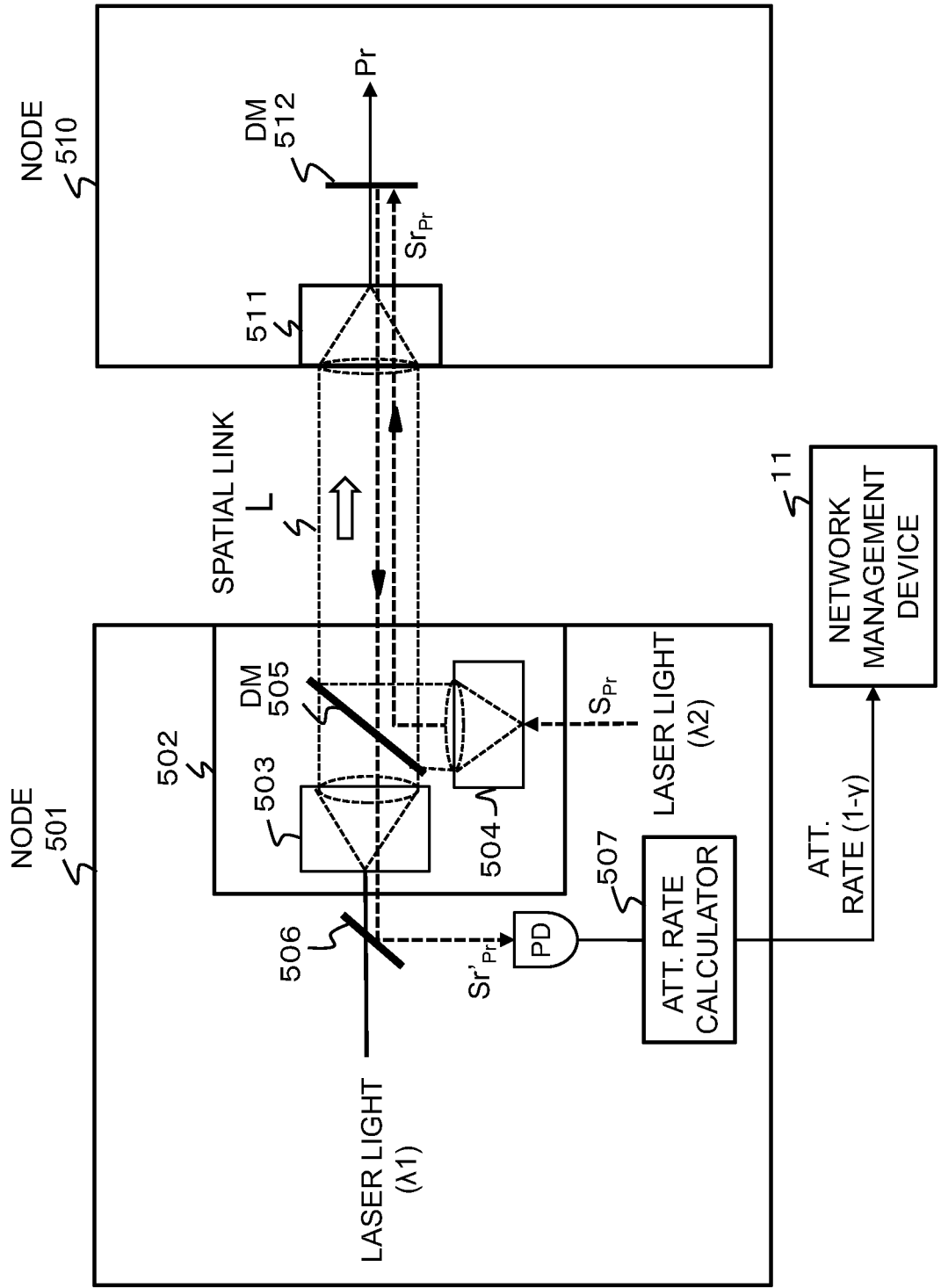
FIG. 10 is a diagram illustrating the schematic configuration of a system for explaining an example of the attenuation rate detection method in the second example.

As illustrated in FIG. 10, it is assumed that adjacent node 501 and 510 are connected to each other through an arbitrary spatial link L. The node 501 includes a transmitting-side optical system 502, a dichroic mirror (DM) 506, a photodetector PD and an attenuation rate calculator 507. The transmitting-side optical system 502 transmits laser light P of wavelength $\lambda 1$ and probe light $S_{pr}$ of wavelength $\lambda 2$ to the same spatial link L. The probe light $S_{pr}$ is laser light of wavelength $\lambda 2$ having a predetermined pulse width or a predetermined duration and controlled intensity. The configuration of the transmitting-side optical system 502 may be employed for each of the transmitting-side optical systems BEp and BEq in FIG. 9.

The transmitting-side optical system 502 includes beam expanders 503 and 504 and a dichroic mirror (DM) 505. The beam expanders 503 and 504 are an optical element that convert a light beam input from an optical fiber on input port to a collimated light beam of a larger diameter. The DM 505 in the present example is configured to transmit a light beam of wavelength λ1, partly transmit and partly reflect a light beam of other wavelengths (including wavelength λ2). Accordingly, the reference light pulse $P_{LO}$ and signal light pulse $P_Q$ of wavelength λ1 passes through the DM 105. The probe light $S_{pr}$ of wavelength λ2 is partly reflected by the DM 105 and the received probe light $Sr'_{Pr}$ is partly transmitted through the DM 105. It should be noted that the arrangement of the beam expanders 503 and 504 and the DM 505 has been described in the first example (see FIG. 3).

The DM 506 in the present example is configured to transmit light of wavelength λ1 and reflect light of other wavelengths (including wavelength λ2). Accordingly, the laser light P of wavelength λ1 (here, the reference light pulse $P_{LO}$ and signal light pulse $P_Q$ is transmitted through the DM 506 and the received probe light $Sr'_{Pr}$ of wavelength λ2 is reflected by the DM 506.

The node 510 includes a receiving-side optical system composed of a beam expander 511 and a DM 512. The beam expander 511 receives laser light Pr of wavelength λ1 and probe light $Sr_{pr}$ of wavelength λ2 through the spatial link. The DM512 is configured to transmit light of wavelength λ1 and reflect light of other wavelengths (including wavelength λ2). Accordingly, the light Pr of wavelength λ1 is transmitted through the DM512. The probe light $Sr_{pr}$ of wavelength λ2 is reflected by the DM 512 back to the same spatial link.

The received probe light $Sr'_{Pr}$ reflected from the node 510 is partially transmitted through the DM 505, then concentrated by the beam expander 503, and reflected by the DM 506 to the photodetector PD. The photodetector PD outputs detection signal to the attenuation rate calculator 507, which calculates an attenuation rate (1−γ) from the received intensity of the received probe light $Sr'_{Pr}$ obtained by the photodetector PD and the predetermined intensity of the transmitting-side probe light $S_{Pr}$. The attenuation rate (1−γ) thus obtained is notified to the network management device 11.

Since the optical switches SW1 and SW2 and the output-side optical system 202 shown in FIG. 9 are similar to those of FIGS. 4-6, their descriptions are omitted.

3.3) Transmitter

Figure 11:
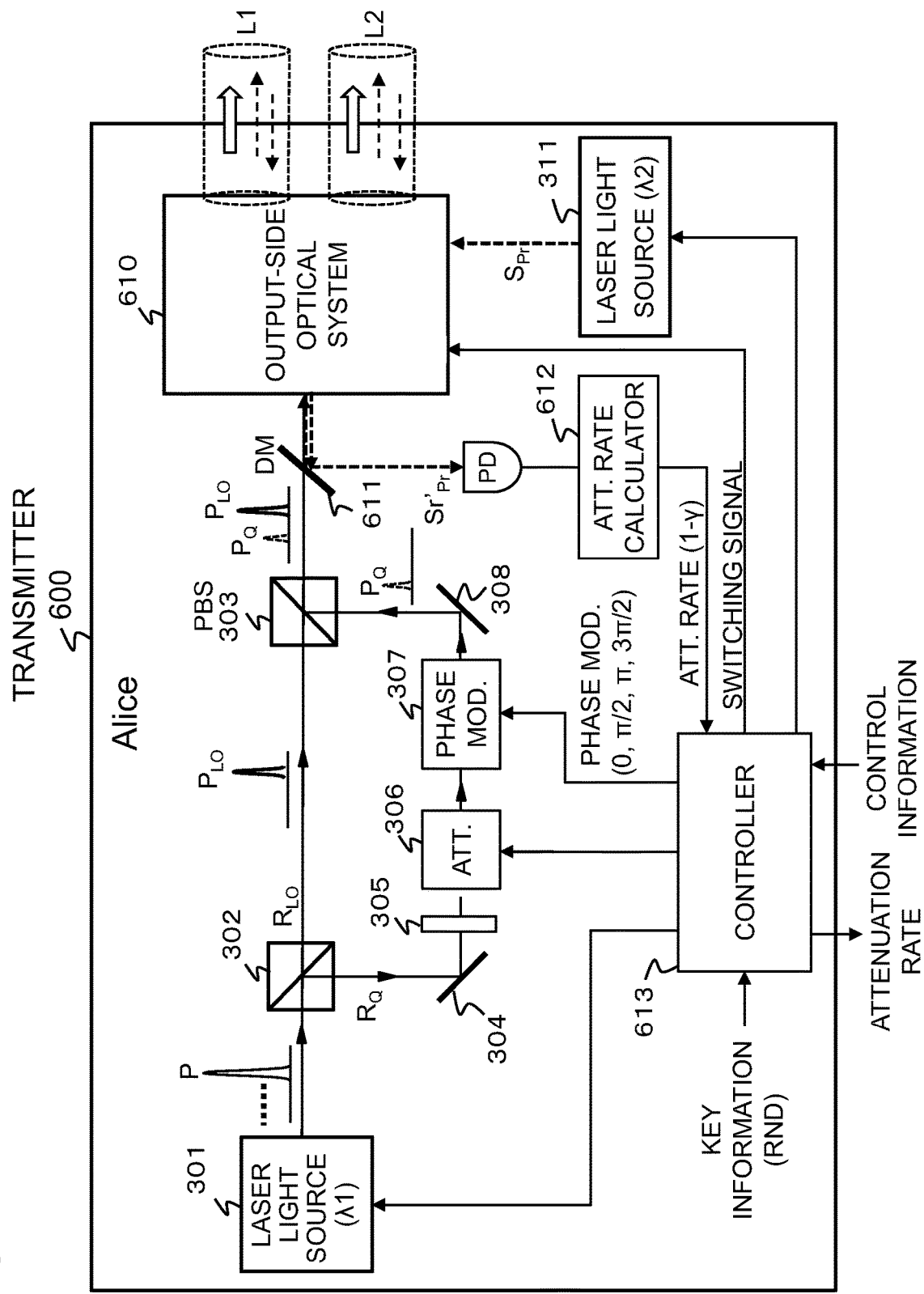
FIG. 11 is a block diagram illustrating the configuration of a transmitter (Alice) in the quantum cryptographic communication network according to the second example of the present disclosure.

As illustrated in FIG. 11, a transmitter 600 corresponds to the above-described transmitter (Alice). As with the transmitter 300 (FIG. 7) according to the first example, the transmitter 600 includes an optical signal system (reference numerals 301-308). Differences between the transmitter 600 and the transmitter 300 according to the first example are as follows.

An output-side optical system 610 has the basically same configuration that is a combination of the output-side optical system 202 in FIG. 9 and the output-side optical system 502 in FIG. 10. A dichroic mirror (DM) 611 is provided between the polarizing beam splitter 303 and the output-side optical system 610. The DM 611 is configured to transmit the reference light pulse $P_{LO}$ and the signal light pulse $P_Q$ of wavelength λ1 and reflect the received probe light $Sr'_{Pr}$ reflected from the downstream node to which the probe light $S_{Pr}$ is transmitted.

The received probe light $Sr'_{Pr}$ reflected from the downstream node is reflected by the DM 611 to the photodetector PD for probe detection. The photodetector PD detects the received probe light $Sr'_{Pr}$ to output the detection signal to the attenuation rate calculator 612. The attenuation rate calculator 612 calculates the attenuation rate (1−γ) from the received intensity of the received probe light $Sr'_{Pr}$ and the predetermined intensity of the transmitting-side probe light $S_{Pr}$.

The controller 109 controls the switching of the optical switch SW2 of the output-side optical system according to the attenuation rate (1−γ). According to the present example, the optical switch SW2 on the output side is switched according to the switching control information received from the network management device 11 so as to select one of the output-side spatial links L1 and L2 which minimizes the route cost.

The functions of the controller 613 and the attenuation rate calculator 612 may be implemented by executing computer programs stored in a memory (not shown in the figure) on processors or CPUs.

3.4) Receiver

Figure 12:
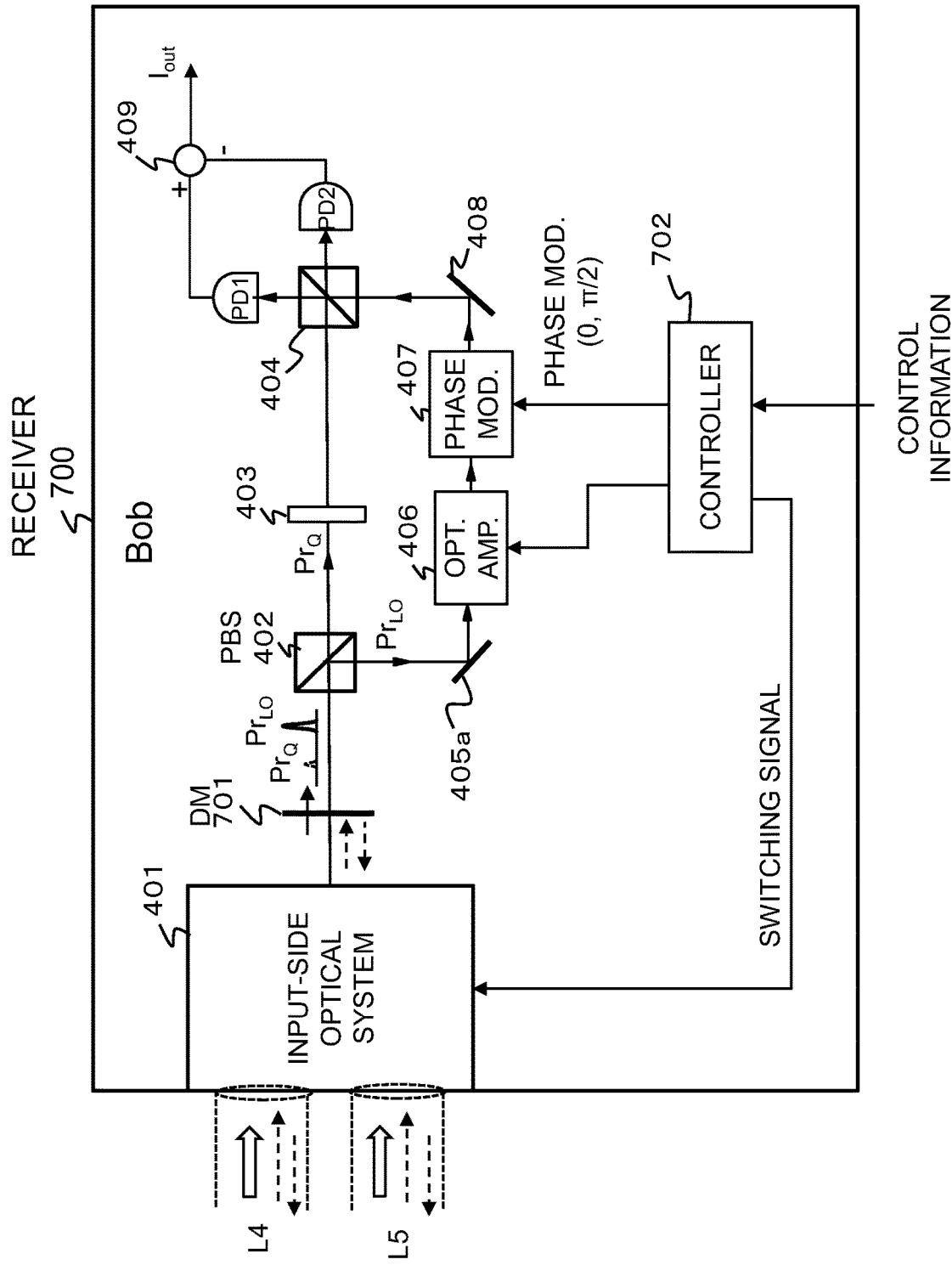
FIG. 12 is a block diagram illustrating the configuration of a receiver (Bob) in the quantum cryptographic communication network according to the second example of the present disclosure.

As illustrated in FIG. 12, a receiver 700 according to the present example corresponds to the receiver (Bob) described above. Similar to the receiver 400 (FIG. 8) according to the first example, the receiver 700 has an input-side optical system 401 and a signal optical system (402-409). Differences from the receiver 400 according to the first example are as follows.

A dichroic mirror (DM) 701 is provided between the polarizing beam splitter 402 and the input-side optical system 401. The DM 701 is configured to transmit the reference light pulse $P_{LO}$ and signal light pulse $P_Q$ of wavelength λ1 and reflect the receive probe light $Sr_{Pr}$ of wavelength λ2. The receive probe light $Sr_{Pr}$ reflected by the DM 701 is returned to the transmitting node through the selected spatial link. Since the other configuration is similar to that of the receiver 400 (FIG. 8) according to the first example, the description is omitted. The above-described functions of a controller 702 can also be realized by executing a program stored in a memory (not shown in the figure) on processors or CPUs.

3.5) Modified Example of Optical Attenuation Detecting Mechanism

Figure 13:
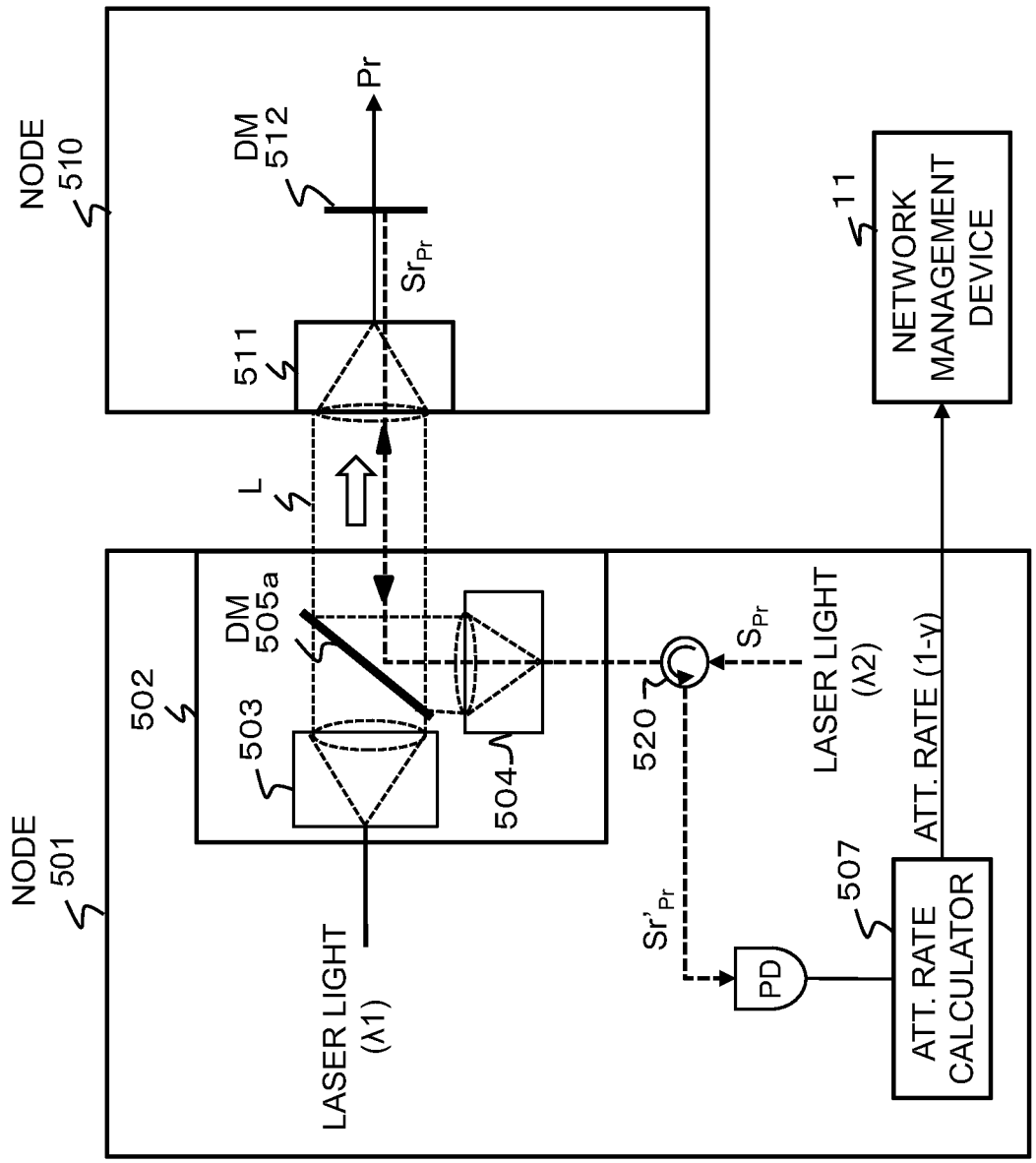
FIG. 13 is a diagram illustrating the schematic configuration of a system for explaining a variant of the transmittance detection method in the quantum cryptographic communication network according to the second example of the present disclosure.

An attenuation detecting mechanism illustrated in FIG. 13 is a modified example of the attenuation detecting mechanism illustrated in FIG. 10. Accordingly, components similar to those described in FIG. 10 are denoted by the same reference numerals. According to this modified example, an optical circulator 520 is provided instead of the DM 506 of FIG. 10 to separate the received probe light $Sr'_{Pr}$ reflected from the node 510.

Referring to FIG. 13, the node 501 includes a transmitting-side optical system 502, the optical circulator 520, the photodetector PD for probe detection and the attenuation rate calculator 507. The transmitting-side optical system 502 includes the beam expanders 503 and 504 and a DM 505a as shown in FIG. 10. The optical circulator 520 inputs the probe light $S_{Pr}$ to output it to the beam expander 504, and inputs the probe light $Sr'_{Pr}$ reflected from the node 510 from the beam expander 504 to output it to the photodetector PD for probe detection. In the present example, the DM 505a is configured to transmit the reference light pulse $P_{LO}$ and signal light pulse $P_Q$ of wavelength λ1 and reflect the probe light $S_{Pr}$ and the receive probe light $Sr'_{Pr}$ of wavelength λ2.

The optical circulator 520 allows the received probe light $Sr'_{Pr}$ to be transferred from the beam expander 504 to the photodetector PD for probe detection. As described above, the attenuation rate calculator 507 calculates the attenuation rate (1−γ) using the intensity of the received probe light Sr'$_{Pr}$. The attenuation rate (1−γ) is notified to the network management device 11.

4. Network Management Device

The network management device 11 described above collects the attenuation rate of each spatial link from each node of the QKD network 10 and performs optical gain control of the reference light and routing control at repeater devices R according to the optical attenuation rate of the spatial link.

Figure 14:
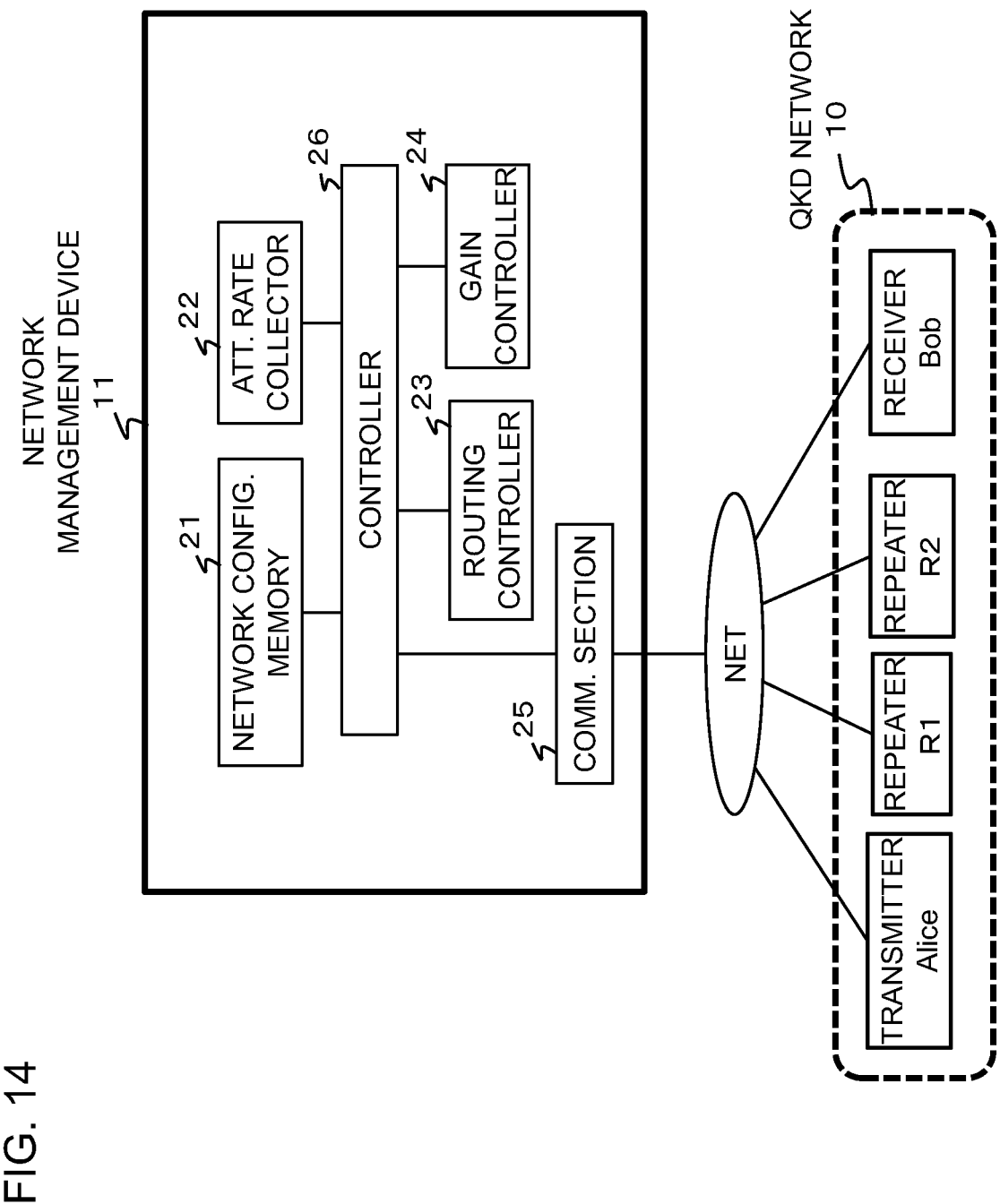
FIG. 14 is a block diagram illustrating the configuration of a network manager in the quantum cryptographic communication network according to the first example embodiment.

As illustrated in FIG. 14, the network management device 11 holds the network configuration of the QKD network 10 in a network configuration memory section 21. An attenuation rate collector 22 instructs each node of the QKD network 10 to periodically detect attenuation rates to collect and hold the detected attenuation rates of spatial links as link information. The routing controller 23 selects the route with the lowest route cost from the transmitter (Alice) to the receiver (Bob) by referring to the collected attenuation rates of the spatial links. A gain controller 24 calculates the optical gain for each repeater device R according to the attenuation rate of each spatial link connected to the repeater device R. A communication section 25 enables information communication with each node of the QKD network 10 through the communication network NET. The controller 26 performs collection of attenuation rates, routing control, gain control, and communication control with each node in the QKD network 10.

The network management device 11 may also be realized by a computer. The functions of the attenuation rate collector 22, routing controller 23, gain controller 24, and controller 26 described above may be realized by executing programs stored in a memory (not shown) on one or more processor or CPU. An example of the control of the network management device 11 will be illustrated in FIG. 15.

Figure 15:
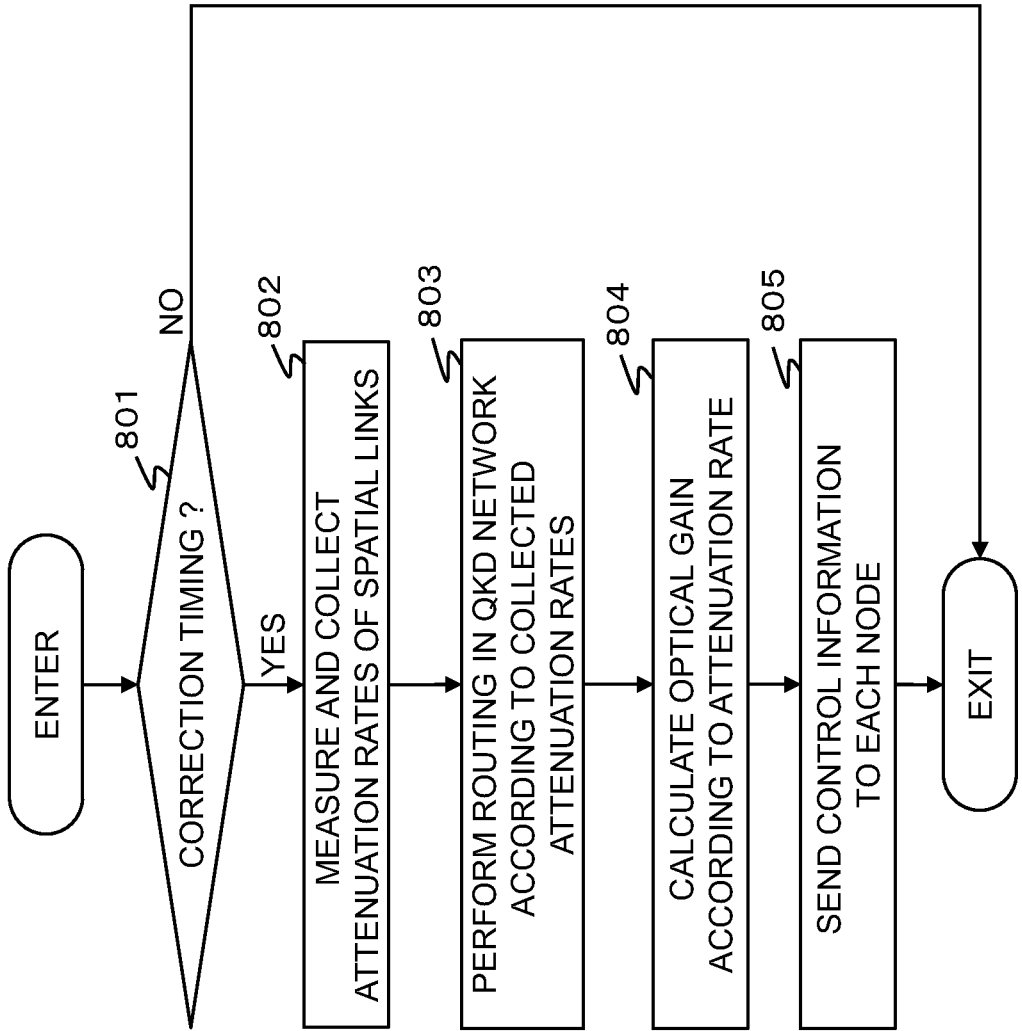
FIG. 15 is a flowchart illustrating an example of network control by a network manager in the quantum cryptographic communication network according to the first example embodiment.

Referring to FIG. 15, the network management unit 11 determines whether or not it is correction timing for each predetermined time slot (operation 801). If it is the correction timing (YES in operation 801), the attenuation rate collector 22 instructs each node to measure the attenuation rate of the spatial link based on the probe light S$_{Pr}$ to collect the measured attenuation rates (operation 802). The routing controller 23 then selects the optimal route from the transmitter (Alice) to the receiver (Bob) according to the collected attenuation rates (operation 803). The gain controller 24 calculates the optical gain for the repeater device R on the route according to the attenuation rate of the spatial link connected to the repeater device R (operation 804). The controller 26 then sends control information to the transmitter (Alice), the repeater device(s)R, and the receiver (Bob) on the route, thereby instructing them to perform route switching and gain setting (operation 805). Except for the correction timing (NO in operation 801), the operations 802 to 805 are not performed. Accordingly, the previously set route and optical gain are maintained.

It should be noted that the optical gain control at the repeater device R and the receiver (Bob) may also be performed at each node instead of the network management device 11. For example, in the repeater device R of the first example illustrated in FIG. 2, the controller 209 may control the gain of the optical amplifier 205 according to the attenuation rate of the input-side spatial link calculated by the attenuation rate calculator 208. In the repeater device R of the second example illustrated in FIG. 9, the controller 209 may control the gain of the optical amplifier 205 according to the attenuation rate of the output-side spatial link calculated by the attenuation rate calculator 252.

5. Third Example

In the above examples, optical gain control of the reference light and routing control are performed according to the optical attenuation rate of a spatial link. According to the third example, in addition to the optical gain control and the routing control described above, the intensity and pulse width of a transmission light pulse are modulated according to the attenuation rate in the transmitter (Alice). More precisely, the intensity is increased and the pulse width is narrowed according to the attenuation rate without changing the energy of the transmission light pulse.

It is assumed that a state in which the attenuation falls within a predetermined range (attenuation rate (1−γ)<6) is referred to as normal state. When the attenuation rate (1−γ) increases to 6 or more, the intensity of a transmission light pulse is changed to P/γ and the pulse width to γt, where P is the intensity of the transmission light pulse and t is the pulse width of the transmission light pulse. As a result, the energy E per pulse is kept at a constant energy E=Pt, independent of the transmission rate γ or attenuation rate (1−γ).

Thus, depending on the optical attenuation rate in the spatial link, the intensity and pulse width of a transmission light pulse are modulated to compensate for the laser light attenuation without changing the energy of the transmission light pulse. In this manner, the level of a homodyne-detected signal at the receiver (Bob) can be maintained within a predetermined range, thereby improving the SN ratio in homodyne detection and the stability of signal output even in the case of optical transmission lines susceptible to environment and having large attenuation rates.

Figure 16:
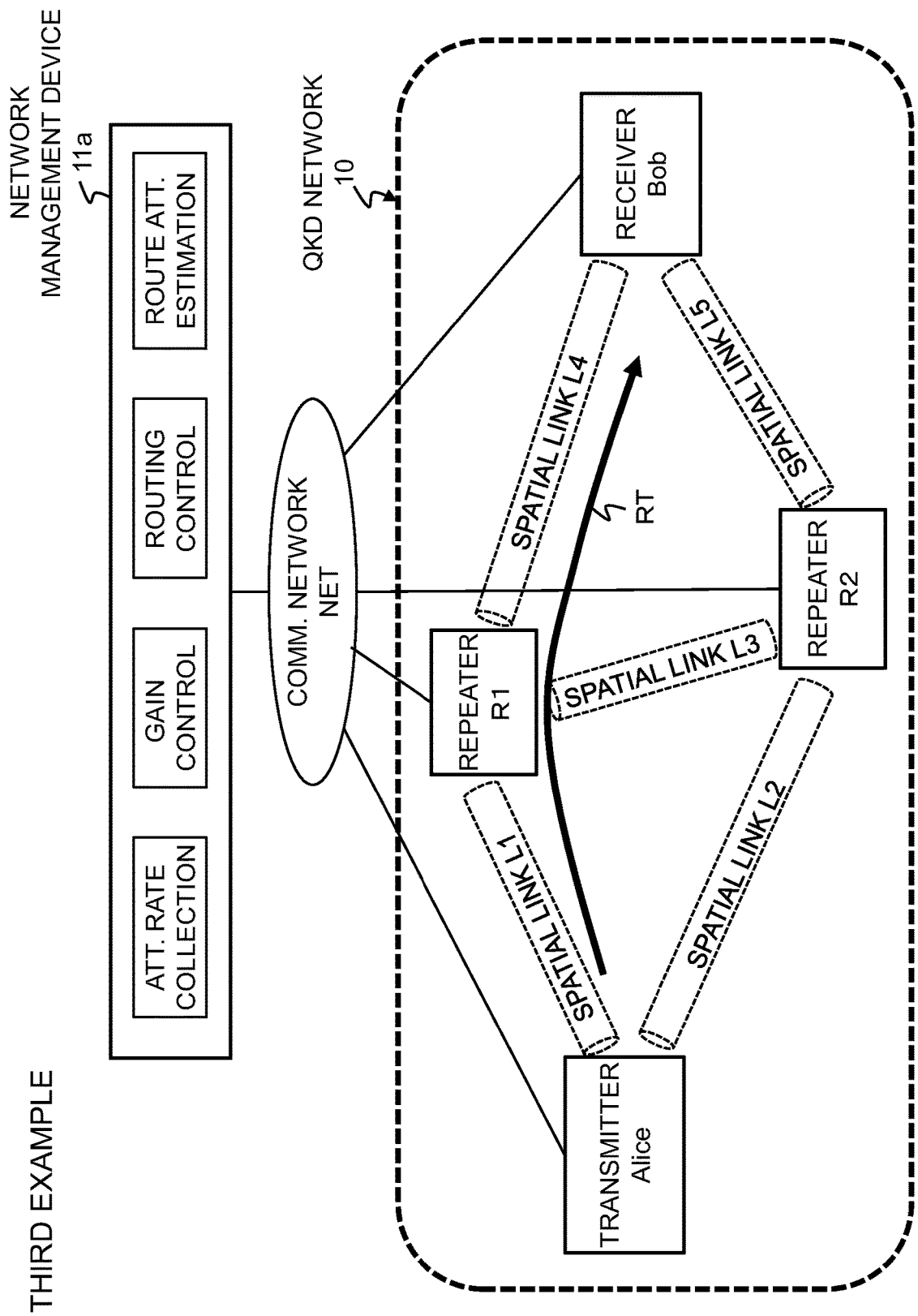
FIG. 16 is a schematic diagram illustrating a quantum cryptography communication network according to a third example of the present disclosure.

As illustrated in FIG. 16, a quantum cryptographic communication network according to a third example of the present disclosure includes the QKD network 10, a network management device 11a, and the communication network NET. The QKD network 10 includes a plurality of nodes connected by spatial links. The plurality of nodes includes the transmitter (Alice), the receiver (Bob), and the plurality of repeater devices connecting the transmitter (Alice) and receiver (Bob). Hereinafter, the QKD network 10 is assumed to have a network configuration in which the transmitter (Alice), the receiver (Bob), and the repeater devices R1 and R2 are connected by spatial links L1 to L5, as illustrated in FIG. 16.

The network management device 11a can collect the attenuation rate (1−γ) of each spatial link in the network and control the optical amplification factor of reference light at repeater devices based on the collected attenuation rates. The network management device 11a can also select the optimal route (e.g., the route RT in FIG. 16) with the lowest total attenuation rate (cost) in the QKD network 10 by referring to the collected attenuation rates. Furthermore, the network management device 11a estimates the route attenuation rate using the attenuation rate (1−γ) of each spatial link and the optical gain at the repeater device(s) on the selected route. The network management device 11a can control the transmitter (Alice) according to the route attenuation rate such that the intensity and pulse width of transmission light pulses are modulated as described above.

A transmission control method according to the third example will be described below with reference to FIG. 17, taking as an example the QKD network 10 including a repeater device R (FIG. 9), the transmitter 600 (FIG. 11) and the receiver 700 (FIG. 12) according to the second example.

It is assumed for simplicity that a light pulse is approximated as a rectangle, its peak value is the pulse power (intensity) [W] and its half width is the pulse width [s]. The case in which a route RT is selected in the QKD network 10 will be explained.

Figure 17:
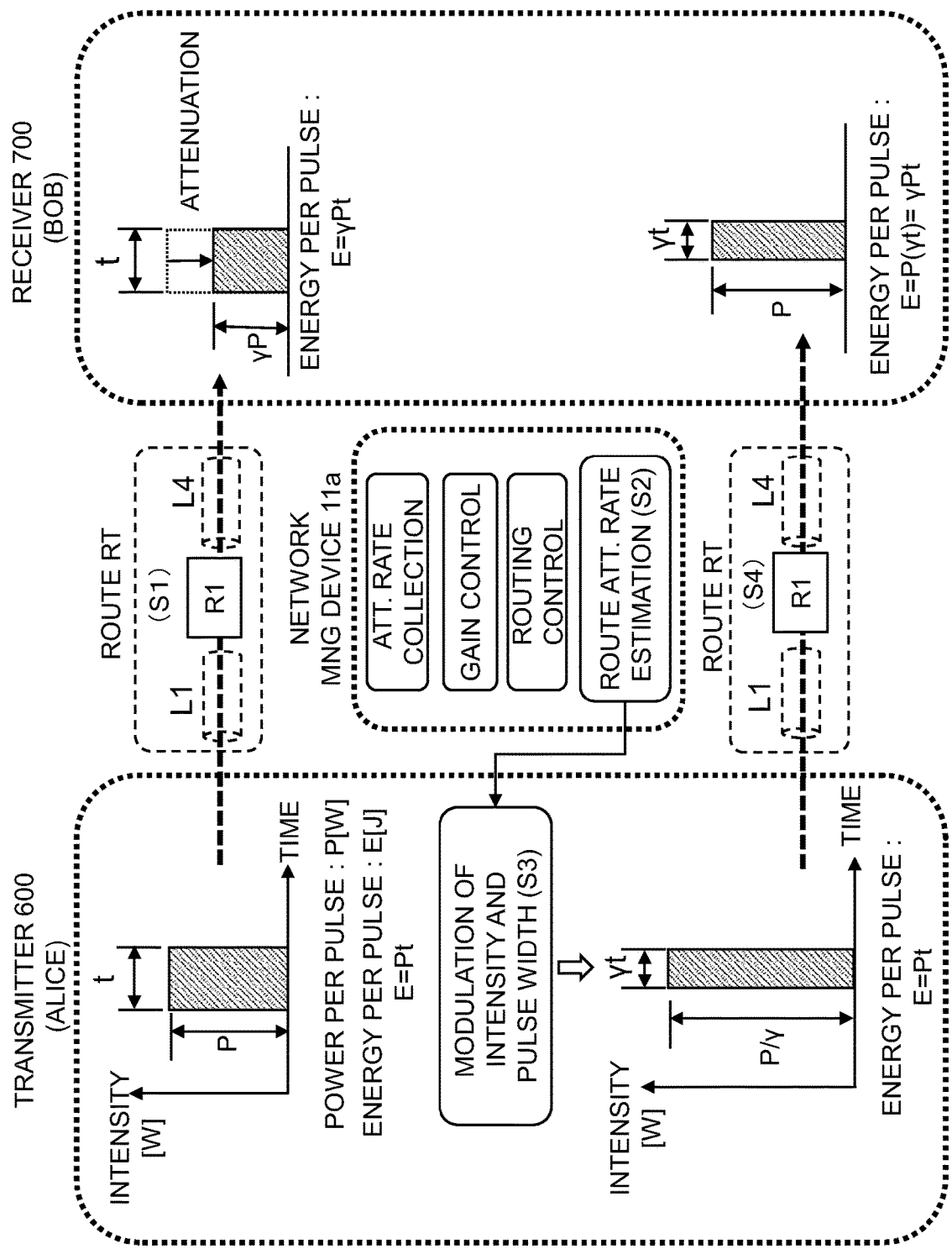
FIG. 17 is a schematic sequence diagram for explaining the modulation control of a transmission pulse in the quantum cryptographic communication network according to the third example.

Referring to FIG. 17, assuming that the power (intensity) and pulse width of a transmission light pulse sent from the transmitter 600 to the route RT are P[W] and t[s], respectively, the energy E[J] of the transmission light pulse is represented by E=P t. The transmission light pulse propagates along the route RT and reaches the receiver 700 (step S1). The received light pulse arriving at the receiver 700 is attenuated in intensity through the route RT. It is assumed that the route attenuation rate is $(1-\gamma)$, where $\gamma$ is the route transmission rate. In this case, the network management device 11a calculates the route attenuation rate $(1-\gamma)$ from the respective optical attenuation rates of spatial links L1 and LA and the optical gain at the repeater device R1 (step S2). The energy E of the received light pulse at the receiver 700 is expressed as E=γPt.

The controller 613 of the transmitter 600 changes the intensity and pulse width of the transmission light pulse according to the route attenuation ratio $(1-\gamma)$ without changing the energy E per transmission light pulse (step S3). More specifically, the pulse width is shortened from t to γt and the intensity is increased from P to P/γ. As a result, the energy E per pulse is maintained at E=Pt.

In the case where the transmitter 600 transmits a transmission light pulse having the intensity and pulse width thus modulated (step S4), the receiver 700 can receive a light pulse of intensity P with pulse width γt. The energy E per pulse is E=γPt, which is the same as the energy of the received optical pulse before modulation in step S1.

Accordingly, fluctuations in intensity of the received light pulse detected by the photodetectors PD1 and PD2 of the receiver 700 can be prevented, improving the stability as well as the SN ratio of the signal output $I_{out}$. Furthermore, since the energy E per pulse does not change when the pulse width and pulse intensity are varied, the pulse modulation according to the present example can be applied to both the reference light LO and the signal light Q.

As described above, the network management device 11a controls the intensity and pulse width of a transmission pulse according to the route attenuation rate, allowing improvements of the SN ratio and stability of the signal output $I_{out}$ obtained by homodyne detection at the receiver 700. Even if the spatial link L is switched at the repeater device in response to detection of an unauthorized interception of quantum cryptographic communication, it is possible to deal with the difference in transmission loss before and after the switchover.

6. Second Example Embodiment

As described above, according to the first example embodiment of the present disclosure, the network management unit 11 performs collecting attenuation rates of respective spatial links, controlling optical gains according to attenuation rates, and controlling route selection. The present disclosure is not limited to such a centralized control scheme. The similar control functions may be implemented in a distributed control scheme by exchanging attenuation information between adjacent nodes in the QKD network.

Figure 18:
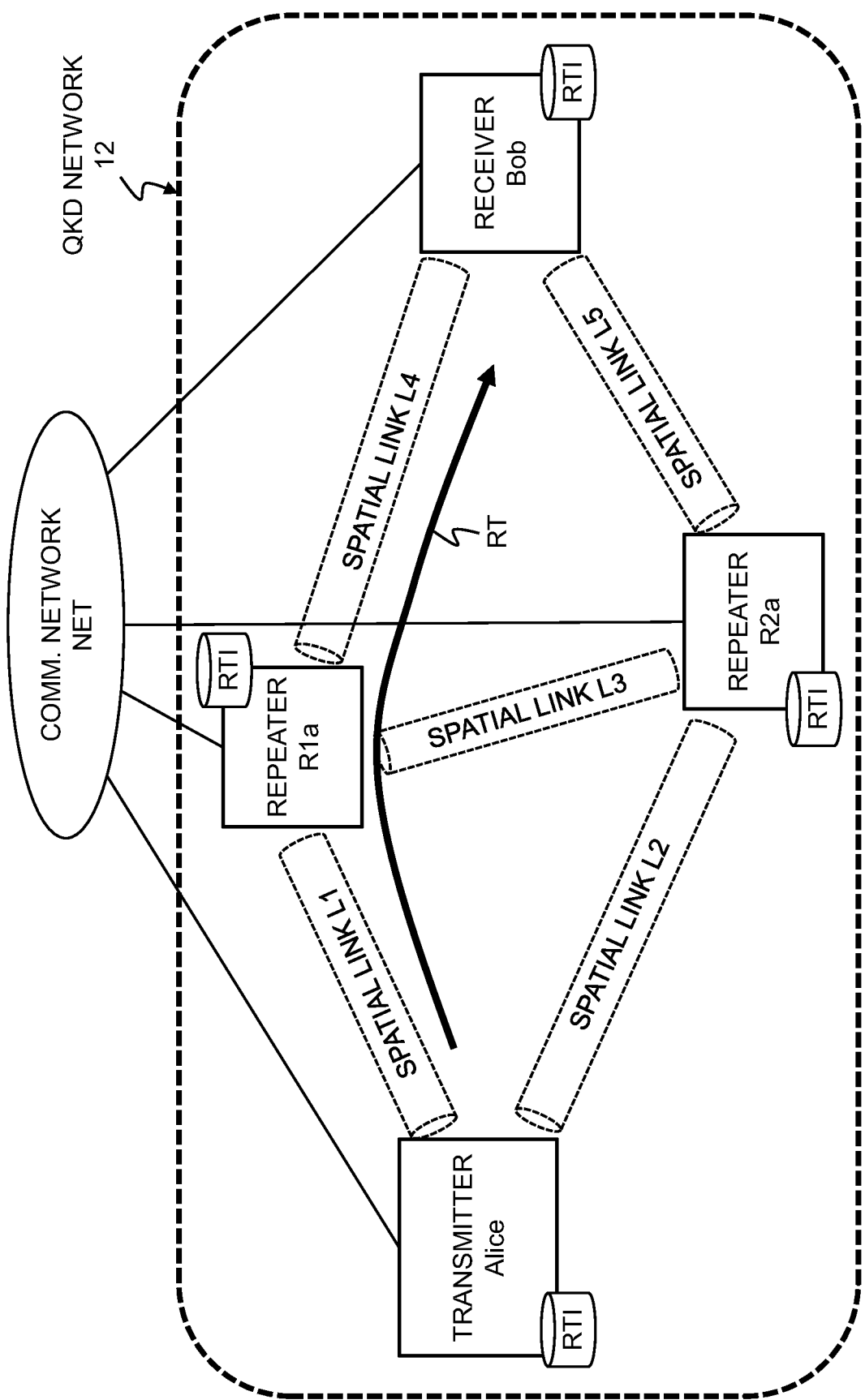
FIG. 18 is a schematic diagram illustrating a quantum cryptography communication network according to a second example embodiment of the present disclosure.

As illustrated in FIG. 18, a quantum cryptographic communication network according to a second example embodiment of the present disclosure includes a QKD network 12 and a communication network NET. The QKD network 12 includes a plurality of nodes connected by spatial links. The plurality of nodes includes a transmitter (Alice), a receiver (Bob), and a plurality of repeater devices connecting the transmitter (Alice) and the receiver (Bob).

Figure 19:
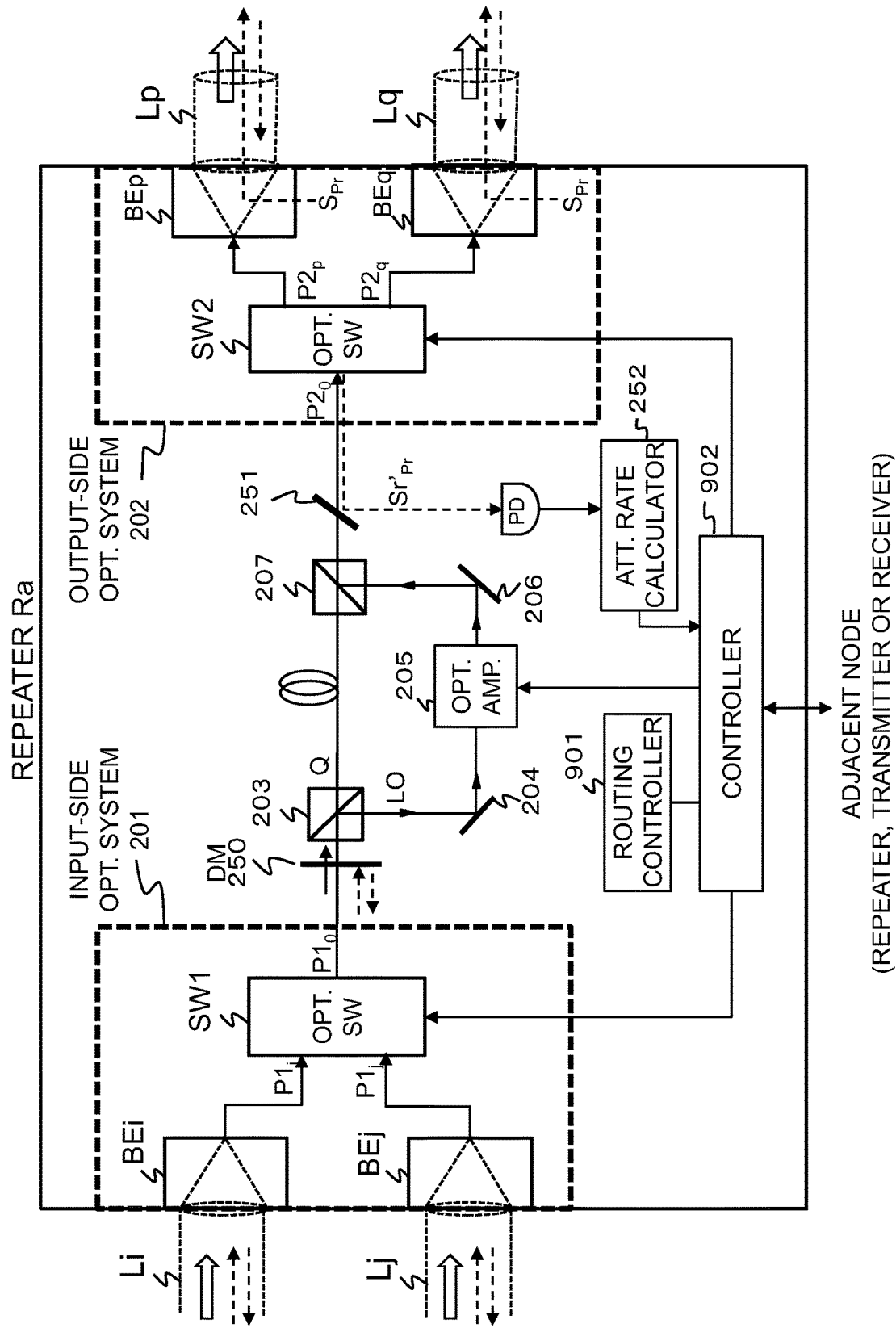
FIG. 19 is a block diagram illustrating the configuration of a repeater device according to the second embodiment of the present disclosure.

Each node in the QKD network 12 holds route link information RTI including attenuation rate information about its own spatial links and attenuation rate information about spatial links of adjacent nodes. Each node can select a route with smaller route cost by referring to the route link information RTI. Such a repeater device Ra (R1a and R2a) are illustrated in FIG. 19. The repeater device Ra employs the attenuation rate detection method of the second example (FIG. 11), but may employ the attenuation rate detection method of the first example (FIG. 2).

Referring to FIG. 19, components similar to those previously described in the second example (FIG. 11) are denoted by the same reference numerals, and detailed descriptions are omitted. The differences from the second example are as follows.

The repeater device Ra has a routing controller 901 and a controller 902. The controller 902 exchanges attenuation rate information with adjacent nodes (another repeater device, transmitter or receiver) through the communication network NET to hold link attenuation rate information of the QKD network 12 as route link information RTI in the routing controller 901. The link attenuation rate information includes the attenuation rate(s) of the spatial link(s) connected to the own node (repeater device Ra) and the attenuation rate(s) of the spatial link(s) connected to the adjacent node.

The controller 902 controls the optical switch SW1 of the input-side optical system 201 and the optical switch SW2 of the output-side optical system 202 with reference to the route link information RTI to select a route with smaller route cost. The controller 902 also controls the gain of the optical amplifier 205 according to the attenuation rate of the selected spatial link.

The functions of the attenuation rate calculator 252, the routing controller 901, and the controller 902 described above can be realized by executing programs stored in a memory (not shown) on one or more processor or CPU.

7. Additional Statements

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional statements.

(Additional Statement 1)

A repeater device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device, wherein the signal light is weak light having quantum states and the reference light is light having no quantum states, the repeater device comprising:

an input-side optical system accommodating at least one input-side spatial link through which the signal light and the reference light are received;

an optical amplifier that optically amplifies only the reference light at a controllable gain;

an output-side optical system accommodating at least one output-side spatial link through which the signal light and amplified reference light are transmitted;

an attenuation rate detector that detects an optical attenuation rate of at least one of the input-side spatial link and the output-side spatial link; and a controller configured to control an optical gain of the optical amplifier and at least one of the input-side optical system and the output-side optical system to select a spatial link through which the signal light and the amplified reference light are transmitted, according to the optical attenuation rate, under control of the network management device.

(Additional Statement 2)

The repeater device according to additional statement 1, wherein the output-side optical system accommodates a plurality of output-side spatial links, wherein the output-side optical system comprises an output-side optical switch configured to output the signal light and the amplified reference light to a selected one of the output-side spatial links.

(Additional Statement 3)

The repeater device according to additional statement 1, wherein the input-side optical system accommodates a plurality of input-side spatial links, wherein the input-side optical system comprises an input-side optical switch configured to receive the signal light and the reference light from a selected one of the input-side spatial links.

(Additional Statement 4)

The repeater device according to additional statement 1, wherein the attenuation rate detector comprises:

a probe light receiver that receives probe light from an adjacent node connected to the repeater device by a spatial link; and an optical attenuation rate calculator that calculates the optical attenuation rate from intensity of probe light arriving through the spatial link.

(Additional Statement 5)

The repeater device according to additional statement 1, wherein the attenuation rate detector comprises:

a probe light transmitter that transmits probe light to an adjacent node connected to the repeater device by a spatial link; and an optical attenuation rate calculator that calculates the optical attenuation rate from intensity of probe light reflected from the adjacent node through the spatial link.

(Additional Statement 6)

A repeater device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device, wherein the signal light is weak light having quantum states and the reference light is light having no quantum states, the repeater device comprising:

an input-side optical system accommodating at least one input-side spatial link through which the signal light and the reference light are received;

an optical amplifier that optically amplifies only the reference light at a controllable gain;

an output-side optical system accommodating at least one output-side spatial link through which the signal light and amplified reference light are transmitted;

an attenuation rate detector that detects an optical attenuation rate of at least one of the input-side spatial link and the output-side spatial link;

a controller configured to control the optical gain of the optical amplifier according to the optical attenuation rate; and a routing controller configured to control at least one of the input-side optical system and the output-side optical system to select a spatial link through which the signal light and the amplified reference light are transmitted, according to the optical attenuation rate and an optical attenuation rate detected by an adjacent node.

(Additional Statement 7)

The repeater device according to additional statement 6, wherein the output-side optical system accommodates a plurality of output-side spatial links, wherein the output-side optical system comprises an output-side optical switch configured to output the signal light and the amplified reference light to a selected one of the output-side spatial links.

(Additional Statement 8)

The repeater device according to additional statement 6, wherein the input-side optical system accommodates a plurality of input-side spatial links, wherein the input-side optical system comprises an input-side optical switch configured to receive the signal light and the reference light from a selected one of the input-side spatial links.

(Additional Statement 9)

The repeater device according to additional statement 6, wherein the attenuation rate detector comprises:

a probe light receiver that receives probe light from an adjacent node connected to the repeater device by a spatial link; and an optical attenuation rate calculator that calculates the optical attenuation rate from intensity of probe light arriving through the spatial link.

(Additional Statement 10)

The repeater device according to additional statement 6, wherein the attenuation rate detector comprises:

a probe light transmitter that transmits probe light to an adjacent node connected to the repeater device by a spatial link; and an optical attenuation rate calculator that calculates the optical attenuation rate from intensity of probe light reflected from the adjacent node through the spatial link.

(Additional Statement 11)

A network management device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device, wherein the signal light is weak light having quantum states and the reference light is light having no quantum states, the network management device comprising:

a storage that stores a network configuration including the nodes and the spatial links;

an attenuation rate collector that collects optical attenuation rates of spatial links accommodated by each node from the plurality of nodes; and a routing controller configured to: select a route in the quantum cryptographic communication network based on the optical attenuation rates of the spatial links; and control each of repeater devices on the route so that each repeater device selects spatial links constituting the route.

(Additional Statement 12)

The network management device according to additional statement 11, wherein each of the plurality of repeater devices includes an optical amplifier that optically amplifies only the reference light at a controllable gain; and
the routing controller configured to control the optical gain of the optical amplifier in the repeater device according to the optical attenuation rates of input-side spatial links accommodated in each of the repeaters on the route.

(Additional Statement 13)

The network management device according to additional statement 11, wherein each of the devices on the route includes an optical amplifier that optically amplifies only the reference light according to optical attenuation rates of input-side spatial links.

(Additional Statement 14)

A transmission control method of a repeater device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device, wherein the signal light is weak light having quantum states and the reference light is light having no quantum states, the method comprising:
by an input-side optical system, accommodating at least one input-side spatial link through which the signal light and the reference light are received;
by an optical amplifier, optically amplifying only the reference light at a controllable gain;
by an output-side optical system, accommodating at least one output-side spatial link through which the signal light and amplified reference light are transmitted;
by an attenuation rate detector, detecting an optical attenuation rate of at least one of the input-side spatial link and the output-side spatial link; and
by a controller under control of the network management device, controlling an optical gain of the optical amplifier and selecting a spatial link through which the signal light and the amplified reference light are transmitted, according to the optical attenuation rate.

(Additional Statement 15)

A transmission control method of a repeater device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device, wherein the signal light is weak light having quantum states and the reference light is light having no quantum states, the method comprising:
by an input-side optical system, accommodating at least one input-side spatial link through which the signal light and the reference light are received;
by an optical amplifier, optically amplifying only the reference light at a controllable gain;
by an output-side optical system, accommodating at least one output-side spatial link through which the signal light and amplified reference light are transmitted;
by an attenuation rate detector, detecting an optical attenuation rate of at least one of the input-side spatial link and the output-side spatial link;
by a controller, controlling an optical gain of the optical amplifier according to the optical attenuation rate; and
by a routing controller, controlling at least one of the input-side optical system and the output-side optical system to select a spatial link through which the signal light and the amplified reference light are transmitted, according to the optical attenuation rate and an optical attenuation rate detected by an adjacent node.

(Additional Statement 16)

A quantum cryptographic communication network managed by a network management device, in which a plurality of nodes including a transmitter, a receiver and a plurality of repeater devices are connected by spatial links, wherein
the transmitter generates signal light and reference light from coherent light, and transmits the signal light and the reference light to the receiver through at least one repeater device, wherein the signal light is weak light having quantum states and the reference light is light having no quantum states,
the repeater device comprises:
an input-side optical system accommodating at least one input-side spatial link through which the signal light and the reference light are received;
an optical amplifier that optically amplifies only the reference light at a controllable gain; and
an output-side optical system accommodating at least one output-side spatial link through which the signal light and amplified reference light are transmitted, and
the network management device collects an optical attenuation rate of each spatial link, controls the optical gain of the optical amplifier according to the optical attenuation rate of the spatial link accommodated in the repeater device, and selects a route for the signal light and the reference light by controlling at least one of the input-side optical system and the output-side optical system of the repeater device between the transmitter and the receiver (Additional Statement 17)

A quantum cryptographic communication network in which a plurality of nodes including a transmitter, a receiver and a plurality of repeater devices are connected by spatial links, wherein
the transmitter generates signal light and reference light from coherent light, and transmits the signal light and the reference light to the receiver through at least one repeater device, wherein the signal light is weak light having quantum states and the reference light is light having no quantum states, and
the repeater device comprises:
an input-side optical system accommodating at least one input-side spatial link through which the signal light and the reference light are received;
an optical amplifier that optically amplifies only the reference light at a controllable gain;
an output-side optical system accommodating at least one output-side spatial link through which the signal light and amplified reference light are transmitted;
an attenuation rate detector that detects an optical attenuation rate of at least one of the input-side spatial link and the output-side spatial link;
a controller configured to control the optical gain of the optical amplifier according to the optical attenuation rate; and a routing controller configured to control at least one of the input-side optical system and the output-side optical system to select a spatial link through which the signal light and the amplified reference light are transmitted, according to the optical attenuation rate and an optical attenuation rate detected by an adjacent node.

(Additional Statement 18)

The quantum cryptographic communication network according to additional statement 16 or 17, wherein the output-side optical system accommodates a plurality of output-side spatial links, wherein the output-side optical system comprises an output-side optical switch configured to output the signal light and the amplified reference light to a selected one of the output-side spatial links.

(Additional Statement 19)

The quantum cryptographic communication network according to additional statement 16 or 17, wherein the input-side optical system accommodates a plurality of input-side spatial links, wherein the input-side optical system comprises an input-side optical switch configured to receive the signal light and the reference light from a selected one of the input-side spatial links.

(Additional Statement 20)

The quantum cryptographic communication network according to additional statement 16 or 17, wherein one node of adjacent nodes connected by the spatial link comprises a transmitter that transmits probe light of predetermined intensity along with the signal light and the reference light to the spatial link; and
the other node of the adjacent nodes comprises an optical attenuation rate calculator that calculates the optical attenuation rate from intensity of probe light arriving through the spatial link.

(Additional Statement 21)

The quantum cryptographic communication network according to additional statement 16 or 17, wherein one node of adjacent nodes connected by the spatial link comprises:
a probe light transmitter that transmits probe light along with the signal light and the reference light to the spatial link; and
an optical attenuation rate calculator that calculates the optical attenuation rate from intensity of probe light reflected from the adjacent node through the spatial link.

(Additional Statement 22)

A program that functions a computer as a repeater device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device, wherein the signal light is weak light having quantum states and the reference light is light having no quantum states,
wherein an input-side optical system accommodates at least one input-side spatial link through which the signal light and the reference light are received; an optical amplifier optically amplifies only the reference light at a controllable gain; and an output-side optical system accommodates at least one output-side spatial link through which the signal light and amplified reference light are transmitted,
the program functioning the computer to implement functions of
detecting an optical attenuation rate of at least one of the input-side spatial link and the output-side spatial link; and
notifying the optical attenuation rate to a network management device, controlling an optical gain of the optical amplifier and at least one of the input-side optical system and the output-side optical system to select a spatial link through which the signal light and the amplified reference light are transmitted, according to control information received from the network management device, wherein the control information is dependent on the optical attenuation rate of the spatial link.

(Additional Statement 23)

A program that functions a computer as a repeater device in a quantum cryptographic communication network in which a plurality of nodes including a transmitter, a receiver and a plurality of repeater devices are connected by spatial links, wherein the transmitter generates signal light and reference light from coherent light, and transmits the signal light and the reference light to the receiver through at least one repeater device,
wherein the signal light is weak light having quantum states and the reference light is light having no quantum states, wherein an input-side optical system accommodates at least one input-side spatial link through which the signal light and the reference light are received; an optical amplifier optically amplifies only the reference light at a controllable gain; and an output-side optical system accommodates at least one output-side spatial link through which the signal light and amplified reference light are transmitted,
the program functioning the computer to implement functions of
detecting an optical attenuation rate of at least one of the input-side spatial link and the output-side spatial link;
controlling the optical gain of the optical amplifier according to the optical attenuation rate; and
controlling at least one of the input-side optical system and the output-side optical system to select a spatial link through which the signal light and the amplified reference light are transmitted, according to the optical attenuation rate and an optical attenuation rate detected by an adjacent node.

8. Further Additional Statements

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following further additional statements.

(Further Additional Statement 1)

A repeater device that receives signal light and reference light and transmits them in a communication network, wherein the signal light and the reference light are generated from coherent light, wherein the signal light is light of weak intensity having quantum states and the reference light is light of normal intensity having no quantum states, the repeater device comprising:

an optical route selector configured to select an input-side spatial link connected to an upstream adjacent node and an output-side spatial link connected to a downstream adjacent node;

a link state detector that detects a link state of at least one of the input-side spatial link and the output-side spatial link, wherein the link state is an attenuation rate or a transmission rate; and a controller configured to control the optical route selector to select an optimal pair of output-side spatial link and input-side spatial link according to the link state.

(Further Additional Statement 2)

The repeater device according to further additional statement 1, wherein the link state detector is configured to detect the link state based on intensity of probe light propagating through said at least one of the input-side spatial link and the output-side spatial link.

(Further Additional Statement 3)

The repeater device according to further additional statement 2, wherein the link state detector comprises:

a probe light receiver that receives the probe light from an adjacent node connected to the repeater device by a spatial link; and a calculator that calculates the link state from the intensity of probe light arriving through the spatial link.

(Further Additional Statement 4)

The repeater device according to further additional statement 2, wherein the link state detector comprises:

a probe light transmitter that transmits the probe light to an adjacent node connected to the repeater device by a spatial link; and a calculator that calculates the link state from the intensity of probe light reflected from the adjacent node through the spatial link.

(Further Additional Statement 5)

The repeater device according to further additional statement 1, wherein the optical route selector comprises:

an input-side optical system configured to selectively accommodate at least one input-side spatial links; and an output-side optical system configured to selectively accommodate at least one output-side spatial links.

(Further Additional Statement 6)

The repeater device according to further additional statement 5, wherein the input-side optical system comprises an input-side optical switch configured to select one of a plurality of input-side spatial links; and the output-side optical system comprises an output-side optical switch configured to select one of a plurality of output-side spatial links.

(Further Additional Statement 7)

The repeater device according to further additional statement 5, further comprising:

an optical amplifier that directly amplifies the reference light out of the signal light and the reference light at a controllable gain, wherein the optical amplifier is provided between the input-side optical system and the output-side optical system.

(Further Additional Statement 8)

The repeater device according to further additional statement 7, wherein the controller is further configured to control the controllable gain of the optical amplifier according to the link state.

(Further Additional Statement 9)

The repeater device according to further additional statement 1, wherein the controller controls the optical route selector according to control information received from a network management device configure to manage the communication network.

(Further Additional Statement 10)

The repeater device according to further additional statement 1, wherein the controller controls the optical route selector according to the link state detected by the link state detector and another link state detected by an adjacent node.

(Further Additional Statement 11)

A network management device in a communication network in which a plurality of nodes including a transmitter, a receiver and a plurality of repeater devices are connected by spatial links, wherein the transmitter generates signal light and reference light from coherent light and transmits the signal light and the reference light to the receiver through at least one repeater device, wherein the signal light is light of weak intensity having quantum states and the reference light is light of normal intensity having no quantum states, the network management device comprising:

a storage that stores a network configuration of the nodes and the spatial links;

a link state collector that collects link states of spatial links accommodated by each node from the plurality of nodes; and a network controller configured to:

select an optimal route in the communication network based on the link states of the spatial links; and control each of repeater devices on the route so that each repeater device selects spatial links constituting the route.

(Further Additional Statement 12)

The network management device according to further additional statement 11, wherein each of the plurality of repeater devices includes:

an optical route selector configured to select an input-side spatial link connected to an upstream adjacent node and an output-side spatial link connected to a downstream adjacent node;

a link state detector that detects a link state of at least one of the input-side spatial link and the output-side spatial link, wherein the link state is an attenuation rate or a transmission rate; and a controller configured to:

send the link state to the network management device; and control the optical route selector to select a pair of output-side spatial link and input-side spatial link according to control information received from the network management device.

(Further Additional Statement 13)

The network management device according to further additional statement 12, wherein each of the plurality of repeater devices includes an optical amplifier that optically amplifies the reference light out of the signal light and the reference light at a controllable gain, wherein the network controller is further configured to control the controllable gain of the optical amplifier in each of the repeater devices on the route according to link states of spatial links accommodated in the repeater device.

(Further Additional Statement 14)

A transmission control method in a repeater device that receives signal light and reference light and transmits them in a communication network, wherein the signal light and the reference light are generated from coherent light, wherein the signal light is light of weak intensity having quantum states and the reference light is light of normal intensity having no quantum states, the method comprising:
by an optical route selector, selecting an input-side spatial link connected to an upstream adjacent node and an output-side spatial link connected to a downstream adjacent node;
by a link state detector, detecting a link state of at least one of the input-side spatial link and the output-side spatial link, wherein the link state is an attenuation rate or a transmission rate; and
by a controller, controlling the optical route selector to select an optimal pair of output-side spatial link and input-side spatial link according to the link state.

(Further Additional Statement 15)
The transmission control method according to further additional statement 14, wherein by the link state detector, the link state is detected based on intensity of probe light propagating through said at least one of the input-side spatial link and the output-side spatial link.

(Further Additional Statement 16)
The transmission control method according to further additional statement 15, wherein by the link state detector,
the probe light is received from an adjacent node connected to the repeater device by a spatial link; and
the link state is calculated from the intensity of probe light arriving through the spatial link.

(Further Additional Statement 17)
The transmission control method according to further additional statement 15, wherein by the link state detector,
the probe light is transmitted to an adjacent node connected to the repeater device by a spatial link; and
the link state is calculated from the intensity of probe light reflected from the adjacent node through the spatial link.

(Further Additional Statement 18)
The transmission control method according to further additional statement 14, wherein in the optical route selector,
an input-side optical system selectively accommodates at least one input-side spatial links; and
an output-side optical system selectively accommodates at least one output-side spatial links.

(Further Additional Statement 19)
The transmission control method according to further additional statement 18, wherein
in the input-side optical system, an input-side optical switch selects one of a plurality of input-side spatial links; and
in the output-side optical system, an output-side optical switch selects one of a plurality of output-side spatial links.

(Further Additional Statement 20)
The transmission control method according to further additional statement 14, further comprising:
by an optical amplifier, directly amplifying the reference light out of the signal light and the reference light at a controllable gain.

(Further Additional Statement 21)
The transmission control method according to further additional statement 20, wherein by the controller, the controllable gain of the optical amplifier is controlled according to the link state.

(Further Additional Statement 22)
The transmission control method according to further additional statement 14, wherein the controller controls the optical route selector according to control information received from a network management device configure to manage the communication network.

(Further Additional Statement 23)
The transmission control method according to further additional statement 14, wherein the controller controls the optical route selector according to the link state detected by the link state detector and another link state detected by an adjacent node.

(Further Additional Statement 24)
A quantum cryptographic communication network managed by a network management device, in which a plurality of nodes including a transmitter, a receiver and a plurality of repeater devices are connected by spatial links, wherein
the transmitter generates signal light and reference light from coherent light, and transmits the signal light and the reference light to the receiver through at least one repeater device, wherein the signal light is weak light having quantum states and the reference light is light having no quantum states,
the repeater device comprises:
an input-side optical system configured to accommodate at least one input-side spatial link through which the signal light and the reference light are received;
an optical amplifier that optically amplifies the reference light out of the signal light and the reference light at a controllable gain; and
an output-side optical system configured to accommodate at least one output-side spatial link through which the signal light and amplified reference light are transmitted, and
the network management device collects an optical attenuation rate of each spatial link, controls the optical gain of the optical amplifier according to the optical attenuation rate of the spatial link accommodated in the repeater device, and selects a route for the signal light and the reference light by controlling at least one of the input-side optical system and the output-side optical system of the repeater device between the transmitter and the receiver The present invention is applicable to quantum key delivery systems.

The invention claimed is:

1. A repeater device that receives signal light and reference light and transmits them in a communication network, wherein the signal light and the reference light are generated from coherent light, wherein the signal light is light of weak intensity having quantum states and the reference light is light of normal intensity having no quantum states, the repeater device comprising:
an optical route selector configured to select an input-side spatial link connected to an upstream adjacent node and an output-side spatial link connected to a downstream adjacent node;
a link state detector that detects a link state of at least one of the input-side spatial link and the output-side spatial link, wherein the link state is an attenuation rate or a transmission rate; and
a controller configured to control the optical route selector to select an optimal pair of output-side spatial link and input-side spatial link according to the link state.

2. The repeater device according to claim 1, wherein the link state detector is configured to detect the link state based on intensity of probe light propagating through said at least one of the input-side spatial link and the output-side spatial link.

3. The repeater device according to claim 2, wherein the link state detector comprises:

a probe light receiver that receives the probe light from an adjacent node connected to the repeater device by a spatial link; and
a calculator that calculates the link state from the intensity of probe light arriving through the spatial link.

4. The repeater device according to claim 2, wherein the link state detector comprises:
a probe light transmitter that transmits the probe light to an adjacent node connected to the repeater device by a spatial link; and
a calculator that calculates the link state from the intensity of probe light reflected from the adjacent node through the spatial link.

5. The repeater device according to claim 1, wherein the optical route selector comprises:
an input-side optical system configured to selectively accommodate at least one input-side spatial links; and
an output-side optical system configured to selectively accommodate at least one output-side spatial links.

6. The repeater device according to claim 5, wherein
the input-side optical system comprises an input-side optical switch configured to select one of a plurality of input-side spatial links; and
the output-side optical system comprises an output-side optical switch configured to select one of a plurality of output-side spatial links.

7. The repeater device according to claim 5, further comprising:
an optical amplifier that directly amplifies the reference light out of the signal light and the reference light at a controllable gain, wherein the optical amplifier is provided between the input-side optical system and the output-side optical system.

8. The repeater device according to claim 7, wherein the controller is further configured to control the controllable gain of the optical amplifier according to the link state.

9. The repeater device according to claim 1, wherein the controller controls the optical route selector according to control information received from a network management device configure to manage the communication network.

10. The repeater device according to claim 1, wherein the controller controls the optical route selector according to the link state detected by the link state detector and another link state detected by an adjacent node.

11. A network management device in a communication network in which a plurality of nodes including a transmitter, a receiver and a plurality of repeater devices are connected by spatial links, wherein the transmitter generates signal light and reference light from coherent light and transmits the signal light and the reference light to the receiver through at least one repeater device, wherein the signal light is light of weak intensity having quantum states and the reference light is light of normal intensity having no quantum states, the network management device comprising:
a storage that stores a network configuration of the nodes and the spatial links;
a link state collector that collects link states of spatial links accommodated by each node from the plurality of nodes; and
a network controller configured to:
select an optimal route in the communication network based on the link states of the spatial links; and
control each of repeater devices on the route so that each repeater device selects spatial links constituting the route.

12. The network management device according to claim 11, wherein each of the plurality of repeater devices includes:
an optical route selector configured to select an input-side spatial link connected to an upstream adjacent node and an output-side spatial link connected to a downstream adjacent node;
a link state detector that detects a link state of at least one of the input-side spatial link and the output-side spatial link, wherein the link state is an attenuation rate or a transmission rate; and
a controller configured to:
send the link state to the network management device; and
control the optical route selector to select a pair of output-side spatial link and input-side spatial link according to control information received from the network management device.

13. The network management device according to claim 12, wherein each of the plurality of repeater devices includes an optical amplifier that optically amplifies the reference light out of the signal light and the reference light at a controllable gain,
wherein the network controller is further configured to control the controllable gain of the optical amplifier in each of the repeater devices on the route according to link states of spatial links accommodated in the repeater device.

14. A transmission control method in a repeater device that receives signal light and reference light and transmits them in a communication network, wherein the signal light and the reference light are generated from coherent light, wherein the signal light is light of weak intensity having quantum states and the reference light is light of normal intensity having no quantum states, the method comprising:
by an optical route selector, selecting an input-side spatial link connected to an upstream adjacent node and an output-side spatial link connected to a downstream adjacent node;
by a link state detector, detecting a link state of at least one of the input-side spatial link and the output-side spatial link, wherein the link state is an attenuation rate or a transmission rate; and
by a controller, controlling the optical route selector to select an optimal pair of output-side spatial link and input-side spatial link according to the link state.

15. The transmission control method according to claim 14, wherein by the link state detector, the link state is detected based on intensity of probe light propagating through said at least one of the input-side spatial link and the output-side spatial link.

16. The transmission control method according to claim 15, wherein by the link state detector,
the probe light is received from an adjacent node connected to the repeater device by a spatial link; and
the link state is calculated from the intensity of probe light arriving through the spatial link.

17. The transmission control method according to claim 15, wherein by the link state detector,
the probe light is transmitted to an adjacent node connected to the repeater device by a spatial link; and
the link state is calculated from the intensity of probe light reflected from the adjacent node through the spatial link.

18. The transmission control method according to claim 14, wherein in the optical route selector, an input-side optical system selectively accommodates at least one input-side spatial links; and an output-side optical system selectively accommodates at least one output-side spatial links.

19. The transmission control method according to claim 14, further comprising:

by an optical amplifier, directly amplifying the reference light out of the signal light and the reference light at a controllable gain.

20. The transmission control method according to claim 19, wherein by the controller, the controllable gain of the optical amplifier is controlled according to the link state.

* * * * *